(12) United States Patent
Shibuya

(10) Patent No.: US 11,519,372 B2
(45) Date of Patent: Dec. 6, 2022

(54) CONTROL DEVICE FOR HIGH-PRESSURE PUMP AND METHOD FOR CONTROLLING THE SAME

(71) Applicant: DENSO CORPORATION, Kariya (JP)

(72) Inventor: Hisatoshi Shibuya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/466,991

(22) Filed: Sep. 3, 2021

(65) Prior Publication Data

US 2021/0396198 A1 Dec. 23, 2021

Related U.S. Application Data

(63) Continuation of application No. PCT/JP2020/009197, filed on Mar. 4, 2020.

(30) Foreign Application Priority Data

Mar. 8, 2019 (JP) .............................. JP2019-042782

(51) Int. Cl.
*F02D 41/20* (2006.01)
*F02M 59/36* (2006.01)
*F02M 59/46* (2006.01)

(52) U.S. Cl.
CPC ........... *F02M 59/366* (2013.01); *F02D 41/20* (2013.01); *F02M 59/466* (2013.01); *F02D 2041/2027* (2013.01)

(58) Field of Classification Search
CPC .... F02M 59/366; F02M 59/466; F02M 59/44; F02M 59/36; F02M 37/00; F02D 41/20; F02D 41/3845; F02D 2041/2027; F02D 2200/025
USPC .......... 123/456, 457, 510, 511; 701/103–105
See application file for complete search history.

(56) References Cited

U.S. PATENT DOCUMENTS

2017/0284389 A1    10/2017   Fukuda

*Primary Examiner* — Hai H Huynh
(74) *Attorney, Agent, or Firm* — Nixon & Vanderhye P.C.

(57) ABSTRACT

A metering valve supplies fuel to and block fuel from a pressurizing chamber by moving a valve body by switching between energization and de-energization of an electromagnetic unit. An energization control unit performs a valve closing control and a valve opening control to reduce operating sound in one opening and closing period in which the valve body opens and closes. A time control unit controls, on determination that the energizing period of the electromagnetic unit exceeds the upper limit value, a moving speed of the valve body when the valve body moves to a valve closing side, such that the energization period of the electromagnetic unit in the one opening and closing period does not exceed the upper limit value, thereby to cause the energization control unit to perform both the valve closing control and the valve opening control in the one opening and closing period.

8 Claims, 15 Drawing Sheets

FIG. 10

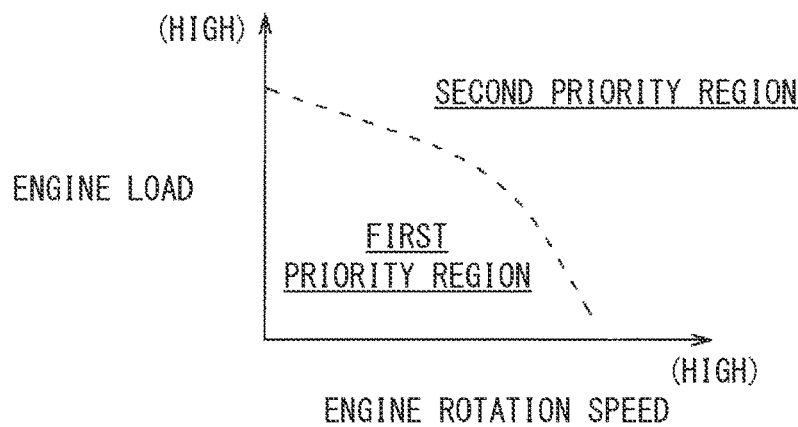

FIG. 11

(a)
FIRST PRIORITY REGION

|  | VALVE CLOSING CONTROL | VALVE OPENING CONTROL |
|---|---|---|
| SOUND REDUCTION CONTROL | LARGE | LARGE |
| ENERGIZATION PERIOD (TIME REDUCTION EFFECT) | LONG (LARGE) | SHORT (SMALL) |
| STOP PRIORITY | 2 | 1 |

(b)
SECOND PRIORITY REGION

|  | VALVE CLOSING CONTROL | VALVE OPENING CONTROL |
|---|---|---|
| SOUND REDUCTION CONTROL | LARGE | LARGE |
| ENERGIZATION PERIOD (TIME REDUCTION EFFECT) | LONG (LARGE) | SHORT (SMALL) |
| STOP PRIORITY | 1 | 2 |

CONTROL DEVICE FOR HIGH-PRESSURE PUMP AND METHOD FOR CONTROLLING THE SAME

CROSS REFERENCE TO RELATED APPLICATION

The present application is a continuation application of International Patent Application No. PCT/JP2020/009197 filed on Mar. 4, 2020, which designated the U. S. and claims the benefit of priority from Japanese Patent Application No. 2019-042782 filed on Mar. 8, 2019. The entire disclosures of all of the above applications are incorporated herein by reference.

TECHNICAL FIELD

The present disclosure relates to a control device for a high-pressure pump. The present disclosure further relates to a method for controlling the high-pressure pump.

BACKGROUND

Conventionally, as a fuel supply system for an internal combustion engine such as a gasoline engine and a diesel engine, a fuel supply system of an in-cylinder injection type is known. This fuel supply system includes a high-pressure pump that increases a pressure of low-pressure fuel pumped from a fuel tank and an accumulator pipe that stores high-pressure fuel pumped from the high-pressure pump. The fuel supply system injects high-pressure fuel in the accumulator pipe directly into a cylinder of an internal combustion engine from a fuel injection valve.

SUMMARY

According to an aspect of the present disclosure, a control device is for a high-pressure pump. The high-pressure pump includes a plunger that is configured to reciprocate with rotation of a rotary shaft to change a volume of a pressurizing chamber and a metering valve that includes a valve body located in a fuel inlet passage communicable with the pressurizing chamber and is configured to switch between energization and de-energization of an electromagnetic unit to move the valve body to supply fuel to and to block fuel from the pressurizing chamber. The control device is configured to switch between an open state and a close state of the metering valve based on an operation state of an internal combustion engine to adjust a fuel discharge amount of the high-pressure pump.

BRIEF DESCRIPTION OF THE DRAWINGS

The above and other objects, features and advantages of the present disclosure will become more apparent from the following detailed description made with reference to the accompanying drawings. In the drawings:

FIG. 10 is a view showing a selection map.

FIG. 11 is a view showing a stop priority map.

DETAILED DESCRIPTION

Figure 1:
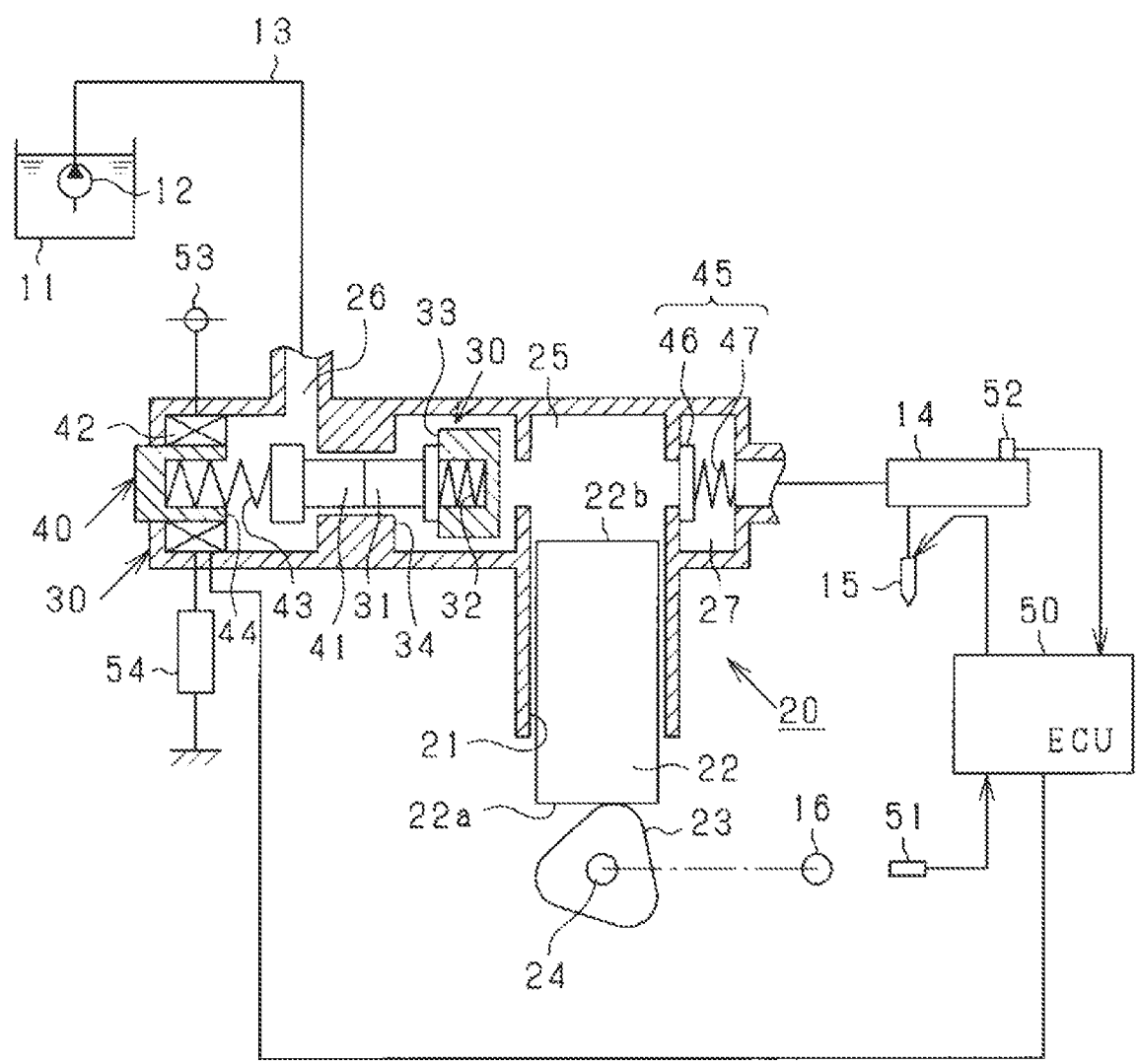
FIG. 1 is a configuration diagram showing an outline of a fuel supply system for an engine.

Hereinafter, examples of the present disclosure will be described.

According to an example of the present disclosure, a fuel supply system is of an in-cylinder injection type and is for an internal combustion engine such as a gasoline engine and a diesel engine. This fuel supply system includes a high-pressure pump that increases a pressure of low-pressure fuel pumped from a fuel tank and an accumulator pipe that stores high-pressure fuel pumped from the high-pressure pump. The fuel supply system injects high-pressure fuel in the accumulator pipe directly into a cylinder of an internal combustion engine from a fuel injection valve. In addition, the high-pressure pump includes a plunger that reciprocates in the cylinder, a pressurizing chamber to which fuel from the low pressure side is introduced, and an electromagnetically driven metering valve that adjusts an amount of fuel to be returned into the pressurizing chamber to control an amount of fuel to be discharged from the high-pressure pump.

When the metering valve operates, vibration occurs when a valve body collides with a movement limiting member (stopper portion). Operating sound caused by this vibration may give an occupant of the vehicle a sense of discomfort. Therefore, in a discharge amount control of a high-pressure pump that uses the metering valve, various techniques for reducing the operating sound accompanied with an opening and closing movement of the valve body are assumable.

According to an example of the present disclosure, a control device is configured to energize a coil with a minimum current value required to completely close the valve body when the valve body is moved to a valve close position. In this way, a collision speed of the valve body with respect to a stopper (that is, a moving speed of the valve body) is slowed down, and the collision noise of the valve body with the stopper is reduced. In this case, by slowing down the moving speed of the valve body, a moving time of the valve body to the valve close position becomes longer.

According to an example of the present disclosure, a control device includes multiple noise reducing measures for reducing the collision noise of the valve body with respect to the stopper at each of multiple timings in one opening and closing period in which the valve body of the metering valve moves to open and close. Further, in a case where it is determined that a coil energization period in one opening and closing period exceeds an upper limit value when all of the sound reduction measures are executed, a part of the sound reduction measures is selected and executed within a range in which the coil energization period in one opening and closing period does not exceed the upper limit. In this way, the operating sound of the high-pressure pump is effectively reduced in a situation where the execution of the sound reduction control is restricted by the upper limit guard of the coil energization period from the viewpoint of hardware protection and the like.

In a case where only a part of the multiple sound reduction measures is to be executed, in the one opening and closing period in which the valve body of the metering valve moves to open and close, a difference between the operating sound in the period when the sound reducing measures is executed and the operating sound in the period when the sound reducing measures is not executed becomes relatively large. In such a case, there is a concern that the operating sound caused during the period when the sound reducing measures is not executed becomes more noticeable and gives the driver a sense of discomfort.

According to an example of the present disclosure, a control device is for a high-pressure pump. The high-pressure pump includes a plunger that is configured to reciprocate with rotation of a rotary shaft to change a volume of a pressurizing chamber and a metering valve that includes a valve body located in a fuel inlet passage communicable with the pressurizing chamber and is configured to switch between energization and de-energization of an electromagnetic unit to move the valve body to supply fuel to and to block fuel from the pressurizing chamber. The control device is configured to switch between an open state and a close state of the metering valve based on an operation state of an internal combustion engine to adjust a fuel discharge amount of the high-pressure pump.

A first configuration includes an energization control unit that is configured to perform, when a predetermined execution condition is satisfied, a valve closing control, which is to reduce a moving speed of the valve body than that in a normal state when the valve body moves to a valve closing side to reduce operating sound caused when the valve body moves to the valve closing side and a valve opening control, which is to reduce operating sound caused when the valve body moves to the valve opening side, by energizing the electromagnetic unit when the valve body moves to a valve opening side, in one opening and closing period in which the valve body opens and closes; an energization determination unit that is configured to determine whether or not an energization period of the electromagnetic unit in the one opening and closing period exceeds a predetermined upper limit value, when both the valve closing control and the valve opening control are performed in the one opening and closing period; a time control unit that is configured to, when the energization determination unit determines that the energization period of the electromagnetic unit exceeds the upper limit value, control a moving speed of the valve body when the valve body moves to the valve closing side to cause the energization control unit to perform both the valve closing control and the valve opening control in the one opening/closing period, such that the energization period of the electromagnetic unit in the one opening/closing period does not exceed the upper limit value.

When noise caused by movement of the valve body is allowed slightly, a moving speed of the valve body increases slightly, so that the energization period of the electromagnetic unit can be shortened. Therefore, the above first configuration slightly increases the moving speed of the valve body, thereby to shorten the energizing period for the valve closing control when the energization control is performed to reduce operating sound accompanied with opening and closing of the metering valve and when the energization period of the electromagnetic unit for the sound reduction control is limited. In this way, the configuration performs both the valve closing control and the valve opening control within the open and close period. The above configuration enables to suppress the operating sound caused when the metering valve is closed and when the valve is opened even in a state where the energizing period to the electromagnetic unit is restricted. In this way, the operating sound accompanied with the opening and closing movement of the valve body can be made as less noticeable as possible throughout the entirety of the opening and closing period during which the valve body opens and closes, while satisfying the restriction of the energizing period in one opening and closing period of the valve body.

A second configuration includes an energization control unit that is configured to perform, when a predetermined execution condition is satisfied, a valve closing control, which is to reduce a moving speed of the valve body than that in a normal state when the valve body moves to a valve closing side to reduce operating sound caused when the valve body moves to the valve closing side and a valve opening control, which is to reduce operating sound caused when the valve body moves to the valve opening side, by energizing the electromagnetic unit when the valve body moves to a valve opening side, in one opening/closing period in which the valve body opens and closes; an energization determination unit that is configured to determine whether or not an energization period of the electromagnetic unit in the one opening/closing period exceeds a predetermined upper limit value, when both the valve closing control and the valve opening control are performed in the one opening/closing period; and a selection control unit that is configured to select and execute one of the valve closing control and the valve opening control, based on the operating condition of the internal combustion engine, when the energization determination unit determines that the energization period of the electromagnetic unit exceeds the upper limit value.

According to the second configuration, when the energization control is performed to reduce the operating sound accompanied with the opening and closing of the metering valve, in a case where the energization period of the electromagnetic unit for the sound reduction control is limited by an upper limit value, one of the valve closing control and the valve opening control is selected and performed based on the operating condition of the internal combustion engine. The sound property differs between the operating sound when the metering valve is opened and the operating sound when the valve is closed. Which of the operating sounds should be suppressed with priority to effectively reduce the noise depends on the operation state of the internal combustion engine. In view of this point, the above configuration enables to make the operating noise accompanied with the opening/closing movement of the valve body as less noticeable as possible, while satisfying the restriction of the energizing time in one opening/closing period of the valve body in a state where the energizing time to the electromagnetic part is restricted.

First Embodiment

Hereinafter, a first embodiment will be described with reference to the drawings. In this embodiment, a fuel supply system for supplying fuel to an in-vehicle gasoline engine of an in-cylinder injection type, which is an internal combustion engine, is provided. The system controls a fuel discharge amount of a high-pressure pump, a fuel injection amount of an injector, and the like, with an electronic control unit (hereinafter referred to as an ECU) as a center device. FIG. 1 shows an overall schematic configuration diagram of this system.

The fuel supply system of FIG. 1 includes a fuel tank 11 that stores fuel and a low-pressure pump 12 that is electromagnetically driven. The low-pressure pump 12 pumps up fuel in the fuel tank 11 and supplies the fuel to the high-pressure pump 20 via a low-pressure pipe 13. The high-pressure pump 20 increases a pressure of the fuel and pumps the fuel to the accumulator pipe 14. The high-pressure fuel pumped to the accumulation pipe 14 is stored in the accumulation pipe 14 in a high-pressure state, and then is directly injected into each of cylinders of the engine from injectors 15 that is attached to the cylinder. A fuel pressure sensor 52 for detecting the fuel pressure is arranged in the accumulator pipe 14, and the fuel pressure in the accumulator pipe 14 is detected by the fuel pressure sensor 52.

Next, the high-pressure pump 20 will be described. The high-pressure pump 20 of this system is a plunger pump, and draws and discharges fuel as a plunger moves.

Specifically, as shown in FIG. 1, in the high-pressure pump 20, a cylinder 21 is in a pump body, and the plunger 22 is inserted into the cylinder 21 so as to be reciprocable in an axial direction. One end 22a of the plunger 22 is in contact with a cam 23 due to an urging force of a spring (not shown). The cam 23 has multiple cam ridges, and is fixed to a cam shaft 24 that is a rotary shaft that rotates with rotation of an output shaft (crankshaft 16) of the engine. When the crankshaft 16 rotates during the operation of the engine, the plunger 22 moves in the cylinder 21 in the axial direction as the cam 23 rotates.

A pressurizing chamber 25 is provided at an other end 22b of the plunger 22. The pressurizing chamber 25 communicates with each of a fuel inlet passage 26 and a fuel discharge passage 27. Fuel is introduced into and discharged from the pressurizing chamber 25 through these passages 26 and 27.

A metering valve 30 is arranged in the fuel inlet passage 26 for supplying fuel to and shutting fuel from the pressurizing chamber 25. The metering valve 30 includes a first valve body 31 arranged in the fuel inlet passage 26 and an electromagnetic actuator 40 for opening and closing the first valve body 31. The metering valve 30 is an on-off valve that allows a flow of fuel and shuts off the flow of fuel in the fuel inlet passage 26 by displacing a first valve body 31.

The electromagnetic actuator 40 is arranged in the fuel inlet passage 26. The electromagnetic actuator 40 includes a second valve body 41 that is configured to move in the same direction as that of the opening and closing movement of the first valve body 31, and a coil 42 as an electromagnetic unit that moves the second valve body 41. The second valve body 41 is held at a valve open position by a spring 43, which is an urging unit, when the coil 42 is not energized. The second valve body 41 is displaced to a position (valve close position) to make contact with a stopper portion 44 against the urging force of the spring 43 when the coil 42 is energized.

The stopper portion 44 is a movement limiting member that limits the movement of the second valve body 41. A power supply 53 is connected to an input terminal of the coil 42, and electric power is supplied from the power supply 53 to the coil 42.

The second valve body 41 moves to abut on and separate from the first valve body 31 thereby to open and close the first valve body 31 by switching between energization and de-energization of the coil 42. Specifically, as shown in (a) in FIG. 2, when the coil 42 is de-energized and the second valve body 41 is in the valve open position, the first valve body 31 is pressed by the second valve body 41. In this way, the first valve body 31 is in contact with a stopper portion 33 against the urging force of a spring 32 attached to the first valve body 31 and is held at a position (valve open position). The stopper portion 33 is a movement limiting member that limits the movement of the first valve body 31. In this state, the first valve body 31 is separated from a valve seat 34, and the low pressure pipe 13 and the pressurizing chamber 25 communicate with each other to allow introduction of low pressure fuel into the pressurizing chamber 25. The state in which the fuel supply to the pressurizing chamber 25 is permitted is an "open state" of the metering valve 30.

Figure 2:
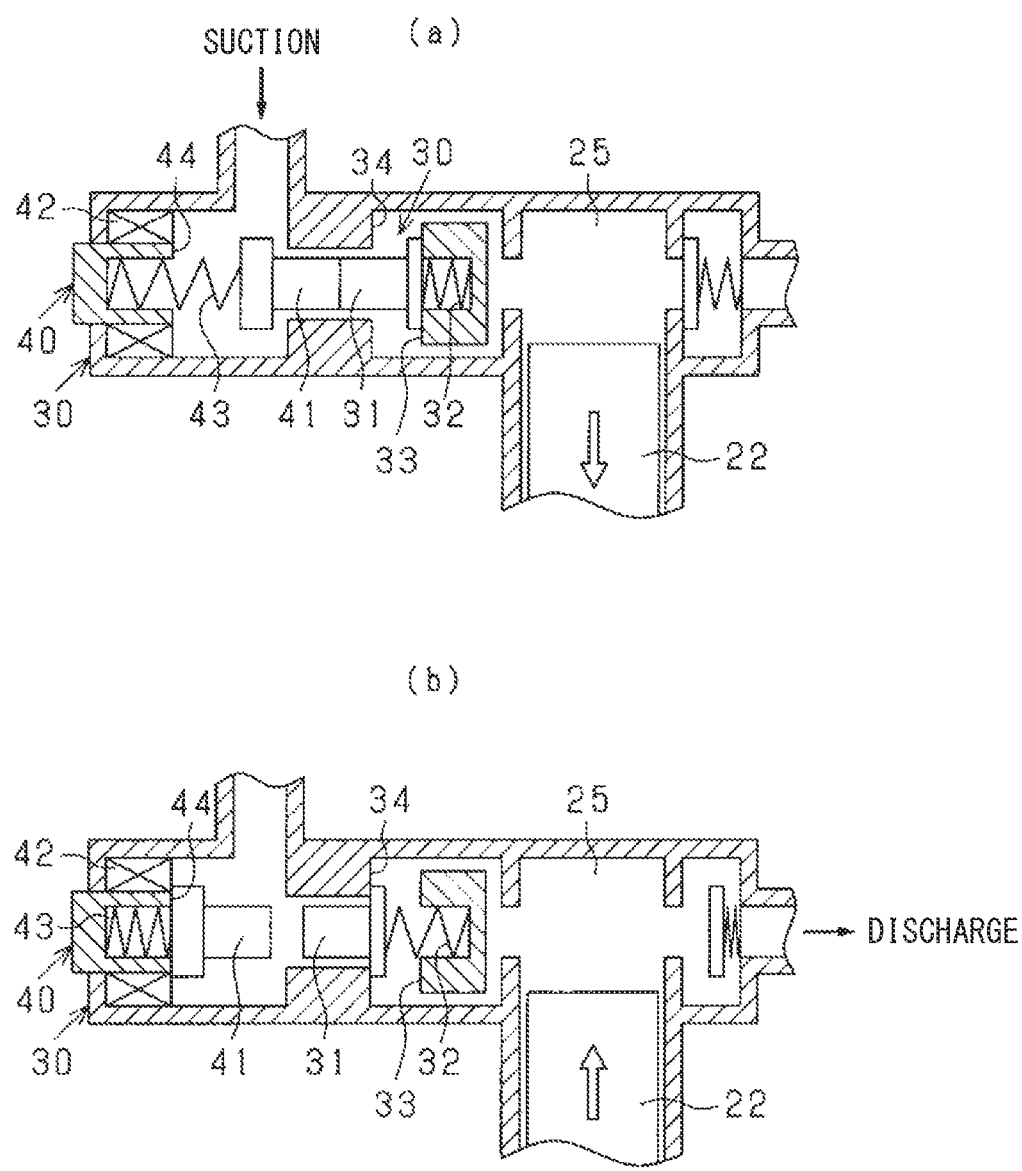
FIG. 2 is a schematic configuration diagram showing a state of a high-pressure pump at the time of fuel suction and fuel discharge.

On the other hand, when the second valve body 41 is in a valve close position due to the energization of the coil 42, as shown in (b) in FIG. 2, the first valve body 31 is released from the pressing by the second valve body 41. In this way, the first valve body 31 is seated on the valve seat 34 by the urging force of the spring 32 and is held in the valve close position. In this state, the flow of fuel in the fuel inlet passage 26 is blocked, and the introduction of low-pressure fuel into the pressurizing chamber 25 is blocked. The state in which the fuel supply to the pressurizing chamber 25 is blocked is the "valve close state" of the metering valve 30.

Detail of the intake and discharge of fuel of the high-pressure pump 20 will be described. When the plunger 22 moves (downward) to increase the volume of the pressurizing chamber 25 while the metering valve 30 is opened, accompanied with this movement, the low-pressure fuel in the low-pressure pipe 13 is introduced into the pressurizing chamber 25 though the fuel inlet passage 26 ((a) in FIG. 2). Further, when the plunger 22 moves (upward) to reduce the volume of the pressurizing chamber 25 while the metering valve 30 is closed, accompanied with this movement, the fuel in the pressurizing chamber 25 is discharged from the pressurizing chamber 25 to the fuel discharge passage 27 ((b) in FIG. 2). In the high-pressure pump 20, a period including one fuel suction stroke and one fuel discharge stroke is one cycle Tp of the pump drive. The high-pressure pump 20 draws and discharges fuel by repeating the cycle of the pump drive. One cycle Tp of the pump drive corresponds to "one opening and closing period in which the valve body moves to open and close".

The fuel discharge amount of the high-pressure pump 20 is adjusted by controlling a valve closing timing of the first valve body 31 according to an energization start timing of the coil 42. Specifically, when the fuel pressure of the accumulator pipe 14 is increased, the valve closing timing of the first valve body 31 is advanced by advancing the energization start timing of the coil 42. In this way, the amount of fuel returned when the plunger 22 moves upward is reduced, and the amount of fuel discharged from the high-pressure pump 20 is increased. On the other hand, when the fuel pressure is reduced, the valve closing timing of the first valve body 31 is retarded by retarding the energization start timing of the coil 42. In this way, the amount of fuel returned when the plunger 22 moves upward is increased, and the amount of fuel discharged from the high-pressure pump 20 is reduced.

The pressurizing chamber 25 is connected to the accumulator pipe 14 through the fuel discharge passage 27. A check valve 45 is provided in a midway portion of the fuel discharge passage 27. The check valve 45 includes a valve body 46 and a spring 47, and the valve body 46 is displaced when the fuel pressure in the pressurizing chamber 25 becomes equal to or higher than a predetermined pressure. Specifically, when the fuel pressure in the pressurizing chamber 25 is less than a predetermined pressure, the valve body 46 is held in a valve close position by an urging force of the spring 47. In this way, discharge of fuel from the pressurizing chamber 25 to the fuel discharge passage 27 is blocked. When the fuel pressure in the pressurizing chamber 25 becomes equal to or higher than the predetermined pressure, the valve body 46 is displaced (opened) against the urging force of the spring 47. In this way, discharge of fuel from the pressurizing chamber 25 to the fuel discharge passage 27 is permitted.

In addition, the system is provided with various sensors such as a crank angle sensor 51 that outputs a rectangular crank angle signal for each predetermined crank angle of the engine and a current sensor 54 that detects the output current of the coil 42.

An ECU 50 mainly includes a microcomputer 55 including a CPU, a ROM, a RAM, and the like, as is well known, and executes various control programs stored in the ROM to perform various controls of the engine in accordance with each engine operation state. That is, the microcomputer 55 inputs detection signals from the various sensors described above, computes control amounts of various parameters related to the engine operation based on the detection signals, and controls the open/close states the injector 15 and the metering valve 30 based on the computed values.

When the metering valve 30 is switched between the opening and closing, vibration is caused when the second valve body 41 and the first valve body 31 collide with the stopper portion and the like, and this vibration causes an operating sound. Specifically, when the metering valve 30 is switched from the valve open state to the valve close state, the second valve body 41 moves to the valve closed side due to the electromagnetic attraction force of the coil 42 and collides with the stopper portion 44 to cause vibration. Further, when the metering valve 30 is switched to the valve open state, the second valve body 41 moves to the valve opening side due to the stoppage of energization of the coil 42. Vibration is caused when the second valve body 41 collides with the first valve body 31 and when the first valve body 31 collides with the stopper portion 33 by being pressed by the second valve body 41. The operating sound accompanied with such vibration is likely heard by an occupant of the vehicle, especially when the vehicle travels at a low speed or when the vehicle is stopped, and may give the occupant a sense of discomfort.

Therefore, in the present embodiment, when a predetermined execution condition is satisfied, the coil 42 is energized in a mode different from a normal state. In this way, the high-pressure pump 20 is driven by a sound reduction control that reduces operating sound. Specifically, the ECU 50 is equipped with multiple sound reduction controls (valve closing control, energization off delay control, and re-energization control) that are executed at multiple timings when operating sound occurs in one opening and closing period in which the first valve body 31 opens/closes. The ECU 50 effectively reduces the operating sound by performing these sound reduction controls in an operation state where the operating sound is noticeable. Hereinafter, the normal control and the sound reduction control when driving the high-pressure pump 20 will be described with reference to FIGS. 3 and 4.

Figure 3:
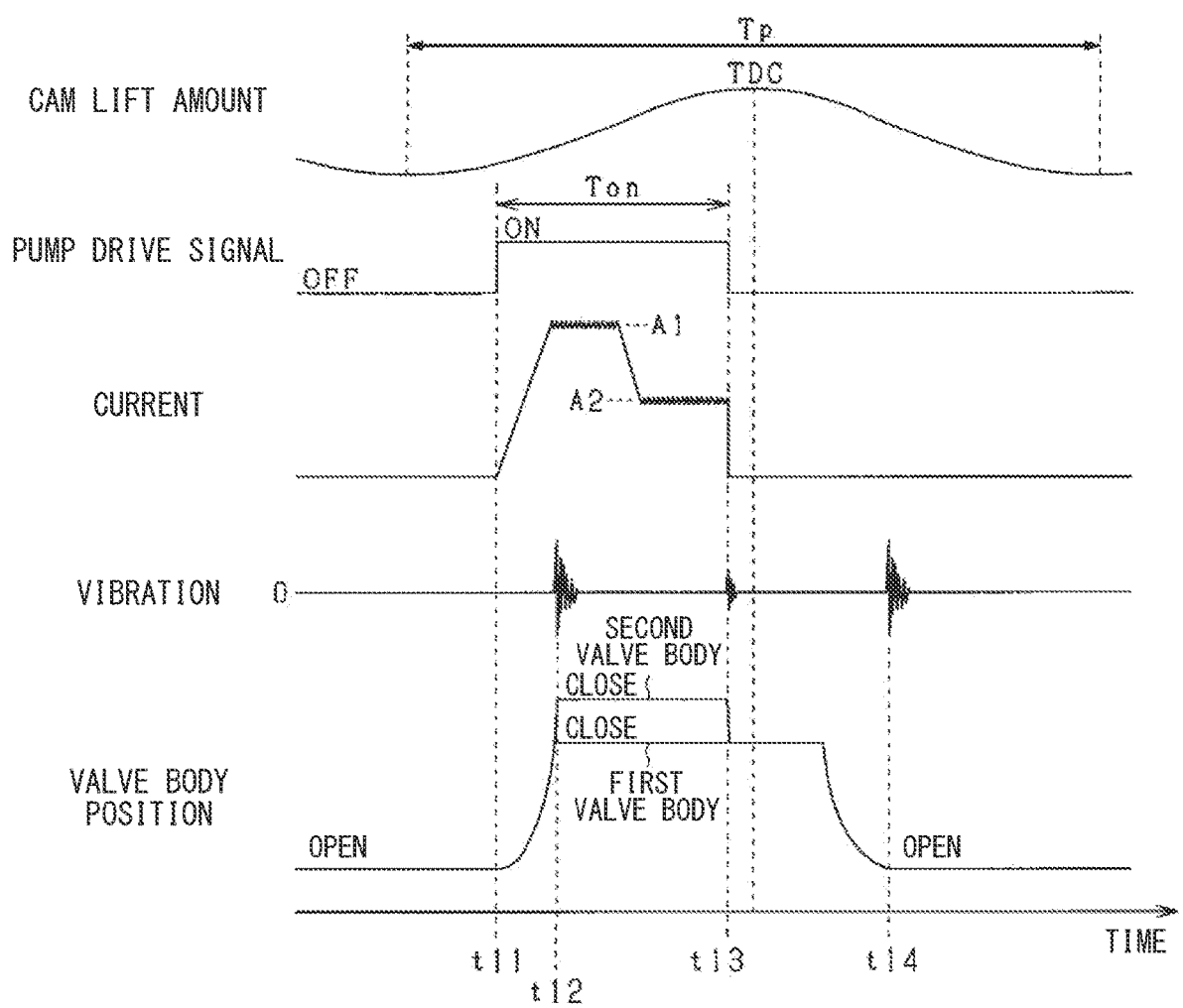
FIG. 3 is a time chart showing a normal control of a high-pressure pump drive.

FIG. 3 is a time chart showing the normal control. The normal control is executed when the execution condition of the sound reduction control is not satisfied, for example, when the operation sound is not noticeable such as during medium and high speed driving. Note that FIGS. 3 and 4 show one fuel discharge period of the high-pressure pump 20.

In FIG. 3, when the valve closing timing comes in a period in which the plunger 22 moves to reduce the volume of the pressurizing chamber 25, the pump drive signal is switched from off to on (time t11). The valve closing timing is computed based on a target value (target fuel pressure) of the fuel pressure of the accumulator pipe 14. In normal control, first, a voltage is applied to the coil 42 at a predetermined voltage drive duty ratio (for example, 100%), and the current flowing through the coil 42 is increased to a first current value A1 (valve closing current) at once. Subsequently, the control shifts to a current control. Specifically, a first constant current control for controlling the coil current at the first current value A1 is executed for a predetermined time. Subsequently, the process shifts to a second constant current control for controlling the coil current at a second current value A2 (holding current), which is lower than the first current value. By this energization control, the second valve body 41 is drawn toward the coil 42 and moves to a position (valve close position) where the second valve body 41 abuts the stopper portion 44. Further, the first valve body 31 is seated on the valve seat 34 and is closed (time t12). At this time, the second valve body 41 collides with the stopper portion 44, and the first valve body 31 collides with the valve seat 34, such that vibration is caused and an operation sound is caused.

When the metering valve 30 is opened, the pump drive signal is switched off, and the energization of the coil 42 is stopped (time t13) at a predetermined valve opening timing (for example, the timing before the top dead center TDC or the top dead center of the plunger 22). By stopping the energization, the second valve body 41 moves to the valve opening side and collides with the first valve body 31, such that vibration that is smaller than the vibration at the time of the valve closing is caused. Further, the first valve body 31 further moves to the valve opening side and collides with the stopper portion 33, such that a large vibration equivalent to the vibration at the time of valve closing is caused again (time t14).

Figure 4:
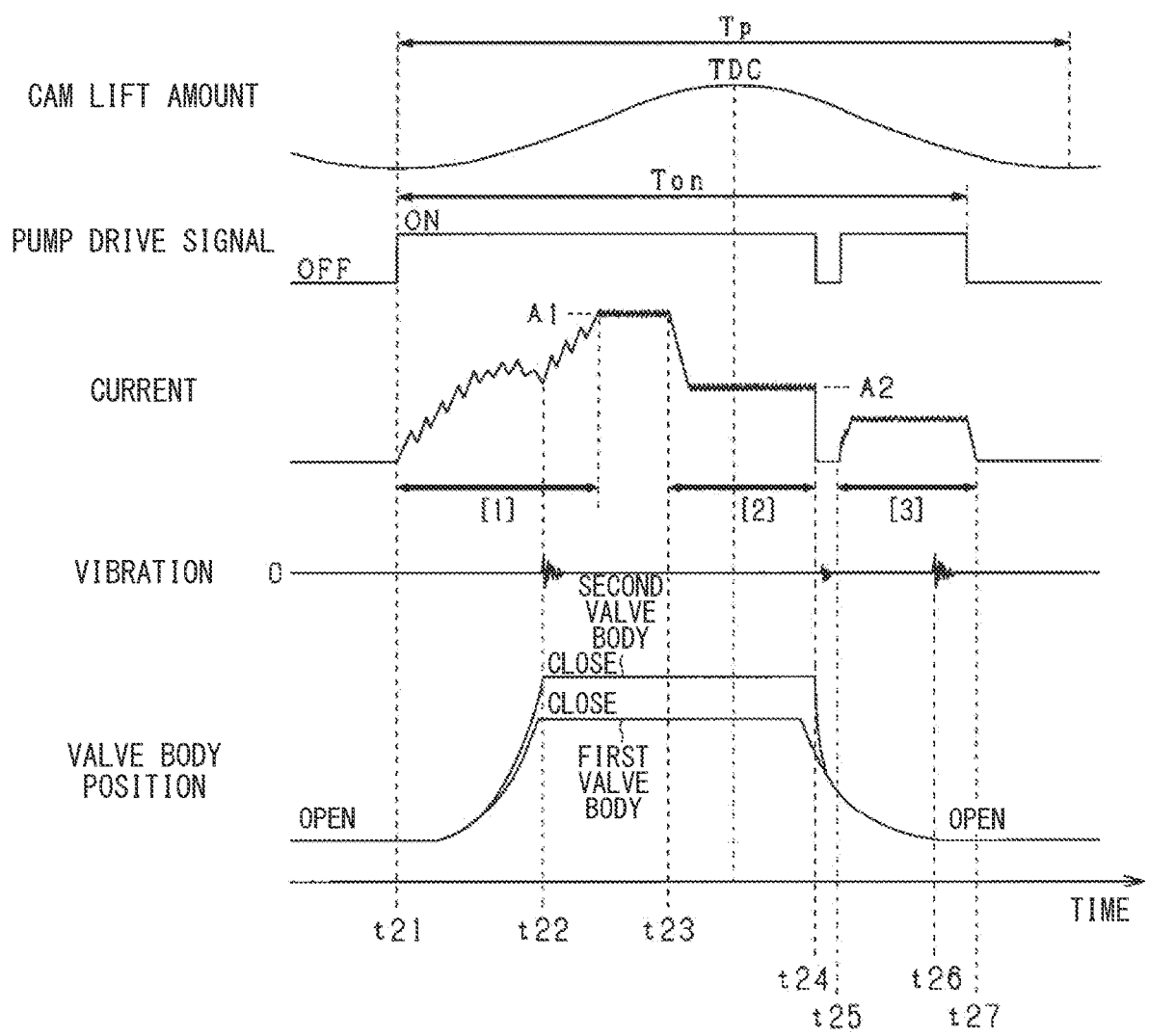
FIG. 4 is a time chart showing a sound reduction control of the high-pressure pump drive.

On the other hand, in the sound reduction control, as shown in FIG. 4, when the metering valve 30 is closed, a voltage duty ratio that is smaller than a voltage duty ratio of the normal control is set, and a valve closing control ([1] in FIG. 4) is performed by PWM driving. In this case, the second valve body 41 moves to the valve closing side at a speed slower than the speed of the normal control, such that the energy when the second valve body 41 collides with the stopper portion 44 becomes smaller. As a result, the vibration and operating sound at the time of collision are reduced (time t22).

In the present embodiment, it is determined whether or not the second valve body 41 has moved to the valve close position by the coil energization control in the previous pump drive. Further, based on the result of the determination of the valve closing, the voltage drive duty ratio when the voltage is applied to the coil 42 or a pump supply power is set. More specifically, when it is determined that the second valve body 41 has moved to the valve close position in the pump drive in the previous cycle, the voltage drive duty ratio or the pump supply power in the previous pump drive, which is reduced by a predetermined amount, is set as a command value at this time. Further, the coil 42 is energized with the command value. On the other hand, when it is determined that the second valve body 41 has not moved to the valve close position in the previous pump drive, the voltage drive duty ratio or the pump supply power in the previous pump drive, which is increased by the predetermined amount, is set as the command value at this time. Further, the coil 42 is energized with the command value.

The coil current is slowly increased to the first current value A1 (that is, the rising speed of the drive current is made slower than the normal state). As a result, a temporary decrease occurs in the current at time t22 in the process of increasing the current. This change in the current is due to a change in an inductance of the coil 42 as the second valve body 41 approaches the coil 42. The time t22 at which the current temporarily drops indicates that the second valve body 41 has moved to the valve close position, that is, the metering valve 30 has been closed. By utilizing this, in the present embodiment, the determination of the valve closing of the second valve body 41 is carried out based on the change in the current. The time from the time t21 when the energization of the coil 42 is started to the time t22 when the current temporarily drops is the time (valve closing required time) required for the metering valve 30 to move from the valve open position to the valve close position. In the sound reduction control, the valve closing required time becomes longer than that in the normal control by slowing down the moving speed of the valve body.

After raising the coil current to the first current value A1 by the PWM drive, the first constant current control and the second constant current control are performed similarly to the normal control. It is noted that, in the sound reduction control, when the metering valve 30 is opened, an energization off delay control is performed as an energization control to extend the period in which the current is held at the second current value A2 to be longer than that in the normal control to extend the period for holding the second valve body 41 on the valve closing side ([2] in FIG. 4).

The reason to perform the energization off delay control to extend the period for holding the second valve body 41 on the valve closing side is as follows. When the metering valve 30 was opened, the fuel pressure in the pressurizing chamber 25 is still high at and near the top dead center TDC of the plunger 22. The fuel pressure in the pressurizing chamber 25 acts in the direction to move the metering valve 30 toward the valve closing side. Therefore, the vibration caused when the second valve body 41 collides with the metering valve 30 becomes large, and the operating sound is caused by this collision (around time t13 in FIG. 3).

In consideration of these issues, in the valve opening control for the sound reduction, the energization of the coil 42 is stopped at a timing later than that in the normal control. In this way, the fuel pressure in the pressurizing chamber 25 is sufficiently reduced, and the second valve body 41 is brought into contact with the first valve body 31 after the first valve body 31 starts moving toward the valve opening side. Specifically, in the normal control, the energization of the coil 42 is stopped before the top dead center (TDC) of the plunger 22 (see FIG. 3). To the contrary, in the energization off delay control, the energization of the coil 42 is stopped after the top dead center of the plunger 22 (time t24 in FIG. 4). At this time, as the fuel pressure in the pressurizing chamber 25 becomes higher, the amount of decrease in the cam lift amount, until the fuel pressure in the pressurizing chamber 25 sufficiently decreases, becomes larger. In consideration of this point, in the present embodiment, as the fuel pressure peak value of the pressurizing chamber 25 becomes higher, an energization extension period of the coil 42 is made longer.

When the energization of the coil 42 is stopped at time t24, the second valve body 41 starts moving to the valve opening side. Vibration is caused when the second valve body 41 collides with the first valve body 31. At this time, by delaying the energization stop timing from that of the normal control, the vibration when the second valve body 41 collides with the first valve body 31 becomes smaller than that in the case of the normal control.

In the valve opening control for the noise reduction, the coil 42 is temporarily re-energized before the second valve body 41 reaches the valve open position after the energization of the coil 42 is stopped at time t24 (time t25 to t27, re-energization control, [3] in FIG. 4). In this way, the electromagnetic attraction force of the coil 42 is temporarily caused, and the moving speed when the second valve body 41 moves to the valve opening side is reduced by this electromagnetic attraction force. By this energization control, the vibration when the first valve body 31 collides with the stopper portion 33 is reduced, and the operating sound caused by the vibration is reduced (time t26). The temporary re-energization by the re-energization control is carried out for a predetermined time with a small current within a range in which the second valve body 41 does not move backward in the valve closing direction. In the present embodiment, a predetermined time is set as an execution period of the re-energization control, and the coil 42 is re-energized. The combination of the energization off delay control and the re-energization control is referred to as a "valve opening control".

An upper limit is set for the coil energization period per cycle Tp of the pump drive due to restrictions of hardware and the like. This is because if the coil energization period is made too long, the drive circuit of the coil 42 may become overheated. In this system, in order to restrict overheating of the coil drive circuit, an energization guard value Tmax (for example, 60 to 70% of one cycle Tp) is set as an upper limit value of an energization width Ton per one cycle Tp of the pump drive. The energizing width Ton is a period that is from a timing, at which the coil energization for moving the metering valve 30 from the valve open position to the valve close position is started, to timing, at which a final energization that is for moving the metering valve 30 in the closed valve state from the valve close position to the valve open position is turned off (see FIGS. 3 and 4).

Herein, when the sound reduction control is performed, the ratio of the energization width Ton in one cycle Tp of the pump drive changes depending on the engine operation state and the like each time, and in some cases, the coil energization period may exceed the upper limit value. Even in such a case, it is desirable to perform the sound reduction control within a range that satisfies the restrictions imposed by the hardware to effectively reduce the pump operating sound. At that time, it is conceivable to perform the sound reduction control while satisfying the hardware restrictions by executing only one of the valve closing control and the valve opening control. However, when only one of the valve closing control and the valve opening control is performed, the difference in sound between the valve closing time and the valve opening time becomes relatively large in one cycle Tp of the pump drive. In such a case, there is a concern that the operating sounds in one of the valve closing time and the valve opening time becomes more noticeable, and it gives an occupant a sense of discomfort.

Therefore, in the present embodiment, when the valve closing control and the valve opening control are performed in one cycle Tp of the pump drive, it is determined whether or not the energization width Ton in one cycle Tp exceeds a predetermined energization guard value Tmax. When it is determined that the energization width Ton exceeds the energization guard value Tmax, the coil energization period of the valve closing control is reduced, such that the energization width Ton does not exceed the energization guard value Tmax. In this way, both the valve closing control and the valve opening control are performed. Thus, a loud noise is restricted from being caused during a part of a period within one cycle Tp of the pump drive, and the noise is reduced as a whole.

Figure 5:
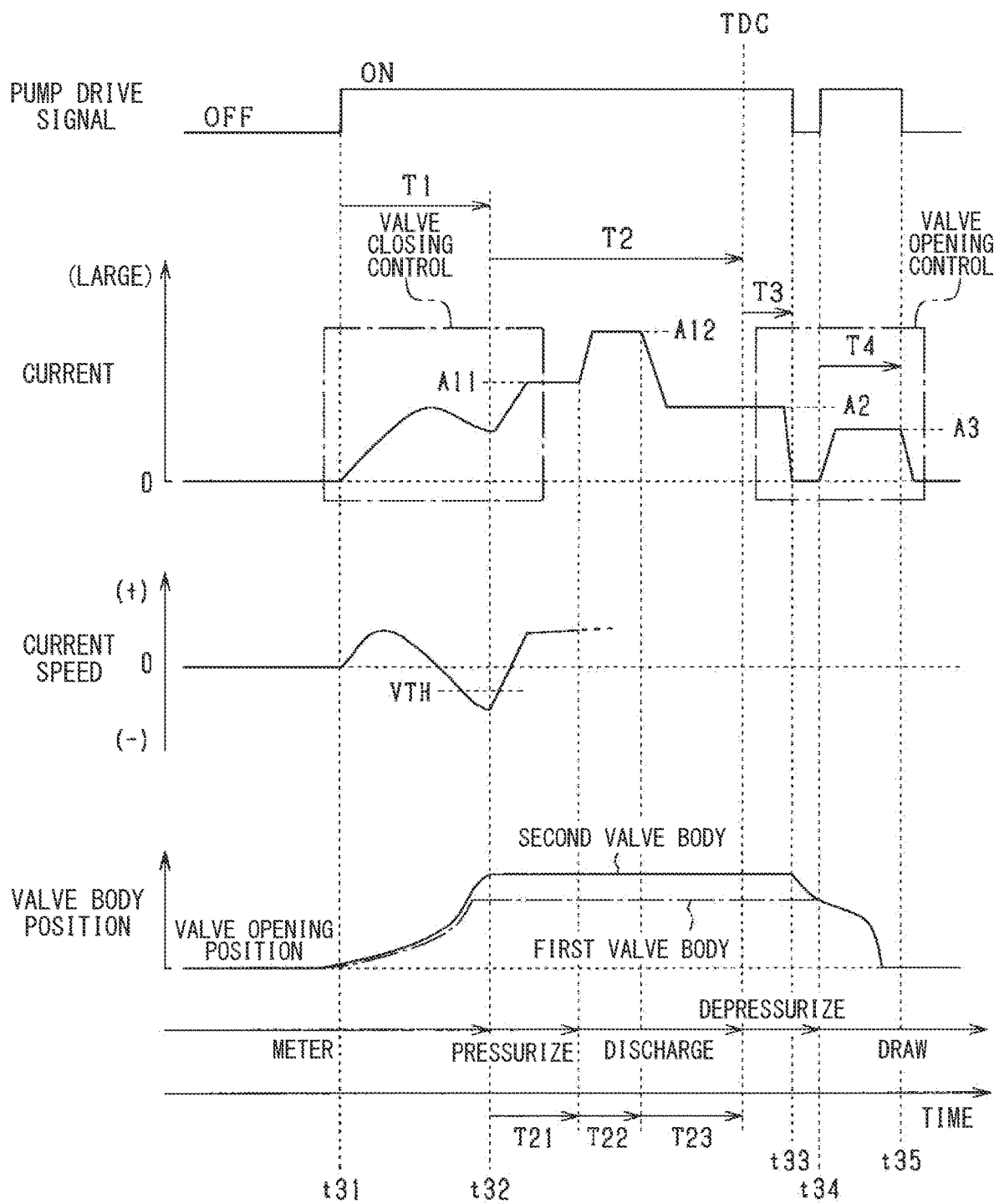
FIG. 5 is a time chart showing the sound reduction control according to a first embodiment.

The sound reduction control of this embodiment will be described with reference to FIGS. 5 and 6. In FIG. 5, when the pump drive signal is switched from off to on at time t31, the second valve body 41 and the first valve body 31 move from the valve open position to the valve close position. The time from time t31 to time t32 is a valve closing required time T1. The time from time t32 to the top dead center TDC of the plunger 22 is an effective discharge time T2. The time from the top dead center TDC of the plunger 22 to time t33 when the pump drive signal is switched off is an energization off delay time T3. The time (time t34 to t35) in which the coil is energized again after time t33 is a re-energization period T4.

The determination of the valve closing of the metering valve 30 is performed on detection of tendency of decrease in the coil current during the on period of the drive signal based on the current velocity (differential value of the current). Specifically, the speed of the current is compared with a determination value VTH (<0), and when the speed of the current becomes less than the determination value VTH, it is determined that the metering valve 30 has reached the close position. As shown in FIG. 5, the valve closing current may be at multiple stages such as a first valve closing current A11 and a second valve closing current A12 (>A11).

Figure 6:
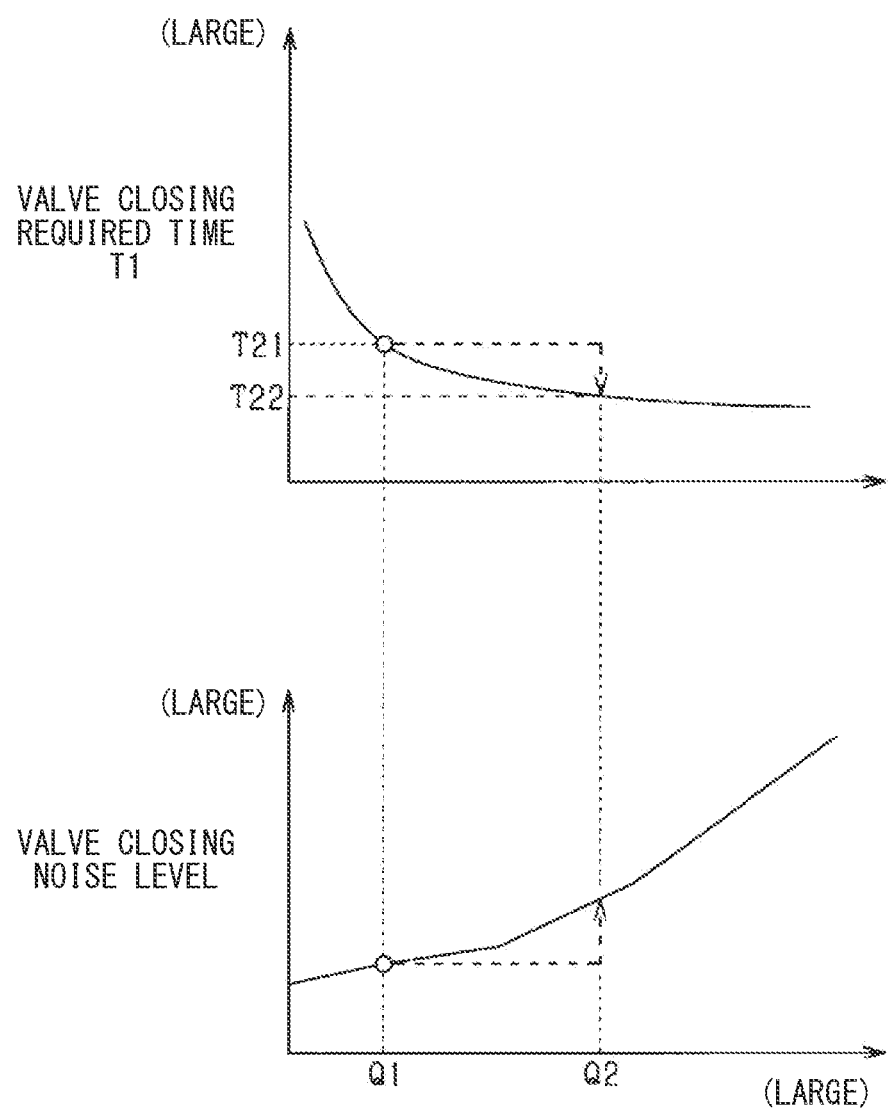
FIG. 6 is a view showing a relationship between a pump supply power, a valve closing required time, and a noise level.

FIG. 6 shows a relationship between the power supply for driving the high-pressure pump (pump supply power) and the valve closing required time T1 (see FIG. 5) of the metering valve 30. In FIG. 6, the upper part shows the relationship between the pump supply power and the valve closing required time T1, and the lower part shows a relationship between the pump supply power and a noise level when the metering valve 30 is closed.

As shown in FIG. 5, as the pump power supply becomes larger, the valve closing required time T1 becomes shorter, and the operating sound when the metering valve 30 is closed becomes louder. When the sound reduction control is performed, in a case where the energization width Ton in one cycle Tp does not exceed the energization guard value Tmax, a sufficiently small value Q1 is set as the pump supply power in order to sufficiently produce the sound reduction effect. In this case, the valve closing required time T1 becomes a relatively long time T21.

On the other hand, in a case where the energization width Ton in one cycle Tp exceeds the energization guard value Tmax, a time T22 that is shorter than the time T21 is set as the target valve closing time TA which is the target value of the valve closing required time T1. Further, the pump supply power or the voltage drive duty ratio is controlled based on the set target valve closing time TA. With this energization control, though the operating sound caused when the metering valve 30 is closed becomes slightly louder, a sufficient time can be secured for the valve opening control. Thus, within the range of the energization guard value Tmax, both the valve closing control and the valve opening control can be performed. In the present embodiment, a feedback control is performed based on a deviation between the detection value of the valve closing required time T1 and the target valve closing time TA.

The embodiment of the sound reduction control shown in FIGS. 5 and 6 will be further described with reference to FIG. 7. In the sound reduction control, even in a case where both the valve closing control and the valve opening control are performed with optimum values for the sound reduction (for example, the value Q1 in FIG. 6 in the valve closing control), the energization width Ton in one cycle Tp does not exceed the energization guard value Tmax, as shown in (a) in FIG. 7, the valve closing required time T1 becomes a sufficiently long time T21. In this case, the collision noise caused by the movement of the second valve body 41 toward the valve closing side is sufficiently suppressed. In the following, the sound reduction control when both the valve closing control and the valve opening control are performed with the optimum values for the sound reduction is referred to as "first reduction control".

On the other hand, in a case where the sound reduction control is performed with the first reduction control and where the energization width Ton exceeds the energization guard value Tmax, the valve opening control that is the same as the first reduction control is performed, and the valve closing control is performed with a feedback control such that the actual valve closing required time T1 matches the target valve closing time TA (second reduction control). More specifically, the ECU 50 sets the time T22, which is shorter than the time T21, as the target valve closing time TA, and controls the pump supply power or the voltage drive duty ratio such that the valve closing required time T1 becomes the time T22. In this case, as shown in (b) in FIG. 7, the valve closing control is performed by shortening the valve closing required time T1, and the valve opening control is performed while securing a sufficient time. In this way, the collision noise caused by the movement of the first valve body 31 and the second valve body 41 is uniformly reduced in one cycle Tp and becomes less noticeable as a whole (see (b) in FIG. 7). In a case where it is not possible to perform both the valve closing control and the valve opening control by shortening the valve closing required time T1, the control is switched to the normal control (see (c) in FIG. 7).

Figure 7:
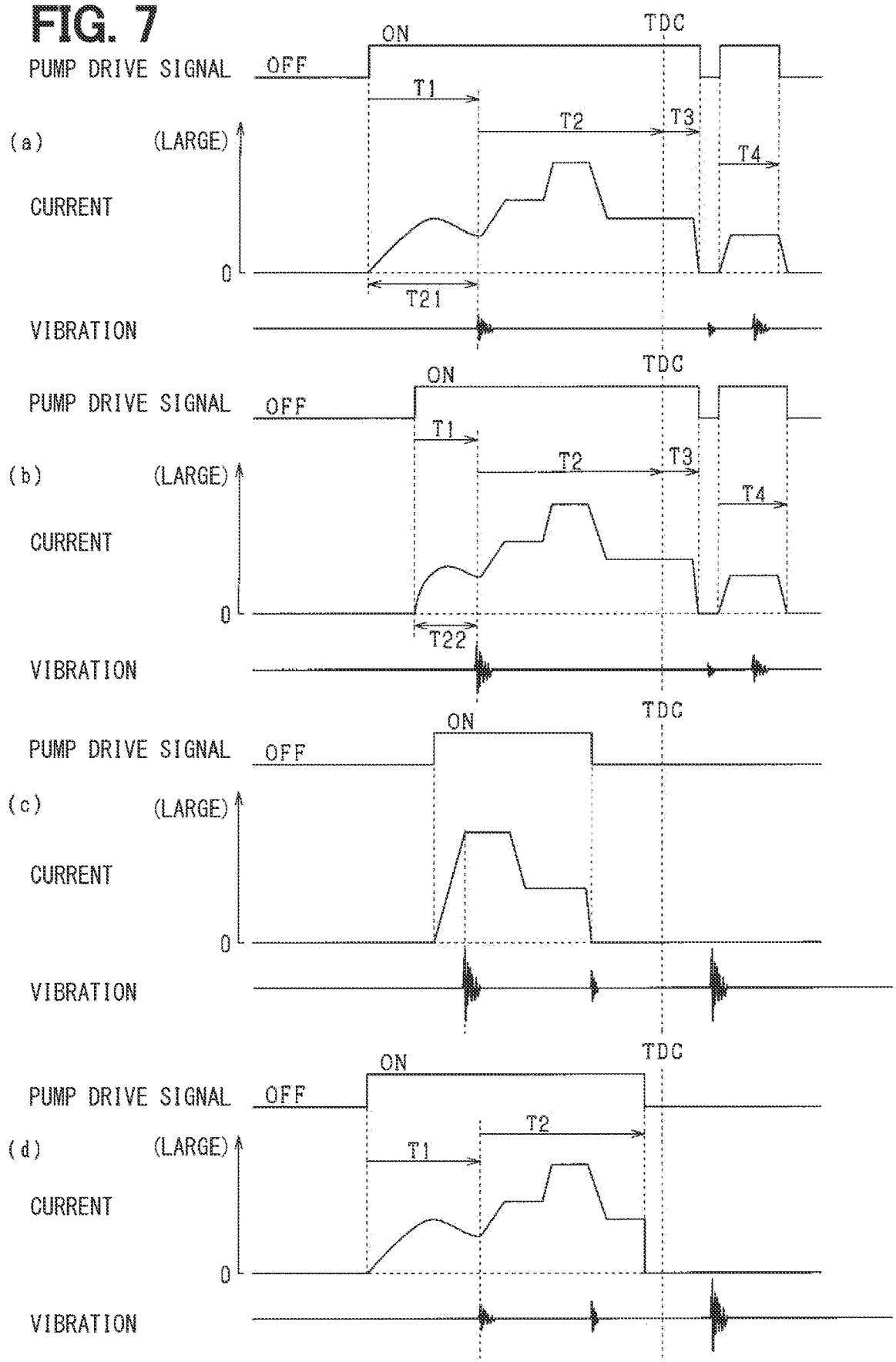
FIG. 7 is a time chart showing a specific mode in a case where execution of the sound reduction control is restricted by an energization guard in the first embodiment.

In a case where all of the valve closing control and the valve opening control are performed with the optimum values for the sound reduction and where the energizing width Ton exceeds the energizing guard value Tmax, when only the valve closing control is performed and the valve opening control is not performed, as shown in (d) in FIG. 7, the operating sound at the time of the valve opening becomes louder than the operating sound at the time of the valve closing. Consequently, the operating sound at the time of the valve opening becomes more noticeable.

Next, a process of the sound reduction control of the present embodiment will be described with reference to the flowchart of FIG. 8. This process is executed by the microcomputer 55 at predetermined intervals.

Figure 8:
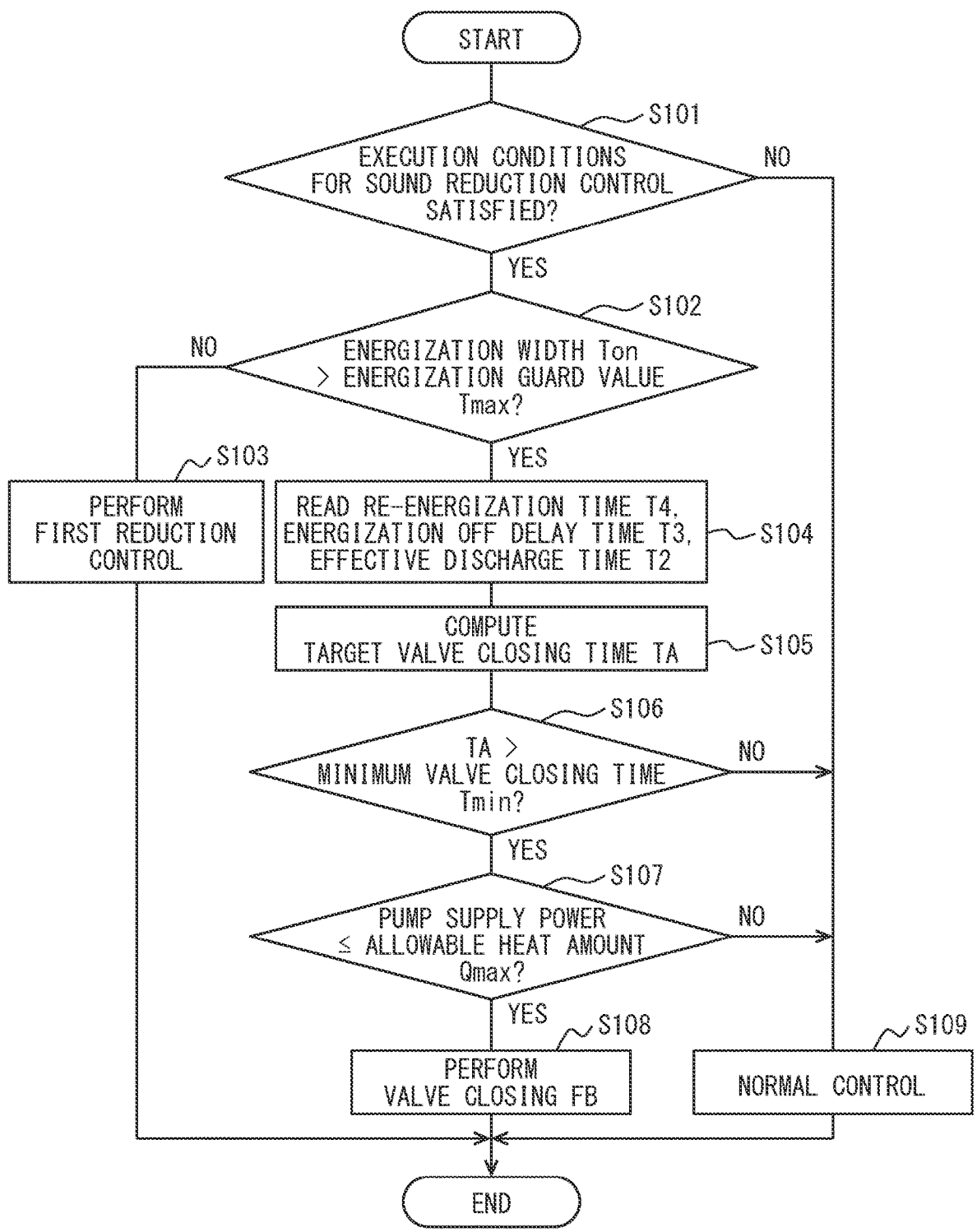
FIG. 8 is a flowchart showing a process of the sound reduction control in the first embodiment.

In FIG. 8, in step S101, it is determined whether or not an execution conditions of the sound reduction control are satisfied. The execution conditions of the sound reduction control include (1) whether the battery voltage is equal to or higher than a predetermined value, (2) whether the vehicle speed is equal to or lower than a predetermined vehicle speed, (3) whether an accelerator operation amount is equal to or lower than a predetermined amount, and (4) whether a deviation between the target fuel pressure and the actual fuel pressure in the accumulator pipe 14 is less than or equal to a predetermined value. In step S101, an affirmative determination is made when all the above conditions (1) to (4) are satisfied.

When the execution conditions of the sound reduction control are not satisfied, the process proceeds to step S109, and the high-pressure pump 20 is driven with the normal control. On the other hand, when the execution conditions of the sound reduction control are satisfied, the process proceeds to step S102 where the energization width Ton for the first reduction control is computed, and is determined whether or not the computed energization width Ton is larger than the energization guard value Tmax. As the energization guard value Tmax, a maximum value (for example, 60% or 70% of one cycle Tp of the pump drive) determined from the viewpoint of thermal protection of the drive circuit of the coil 42 is set.

When the energization width Ton is smaller than the energization guard value Tmax, a negative determination is made in step S102, and the process proceeds to step S103 where the first reduction control is performed as the sound reduction control. In this case, in the valve closing control, the energization control of the coil 42 is performed based on the determination result of the valve closing in the previous pump drive.

On the other hand, when the energization width Ton is larger than the energization guard value Tmax, an affirmative determination is made in step S102, and the process proceeds to step S104 where the re-energization period T4 for the first reduction control, the energization off delay time T3, and the effective discharge time T2 is read. In the following step S105, the target valve closing time TA is computed based on the engine operation state. Herein, an energization permission time T5 is set based on the engine rotation speed. In addition, based on the following equation (1), the target valve closing time TA is computed by subtracting the effective discharge time T2, the energization off delay time T3, and the re-energization period T4 from the energization permission time T5. At this time, a transition period from the energization off delay control to the re-energization control (time t33 to t34 in FIG. 5) may be taken into consideration.

$$TA=T5-(T2+T3+T4) \quad (1)$$

At this time, when the engine speed becomes high, the energization permission time T5 becomes short. Therefore, as the engine speed becomes higher, the target valve closing time TA is set to be shorter.

In the following step S106, it is determined whether or not the target valve closing time TA is larger than a minimum valve closing time Tmin, which is a lower limit guard of the target valve closing time TA. When the target valve closing time TA is smaller than the minimum valve closing time Tmin, the process proceeds to step S109 where the normal control is performed without performing the sound reduction control. On the other hand, when the target valve closing time TA is larger than the minimum valve closing time Tmin, the process proceeds to step S107 where it is determined whether the pump supply power for achieving the target valve closing time TA is equal to or less than an allowable heat amount Qmax. When a negative determination is made in step S107, the process proceeds to step S109 where the normal control is performed.

On the other hand, when an affirmative determination is made in step S107, the process proceeds to step S108 where the feedback control is performed such that the valve closing required time T1 becomes the target valve closing time TA. Specifically, the valve closing required time T1 is detected by performing the valve closing determination based on the change in the current. Further, the feedback control is performed such that the detected valve closing required time T1 coincides with the target valve closing time TA. Thereafter, the process is completed.

Figure 9:
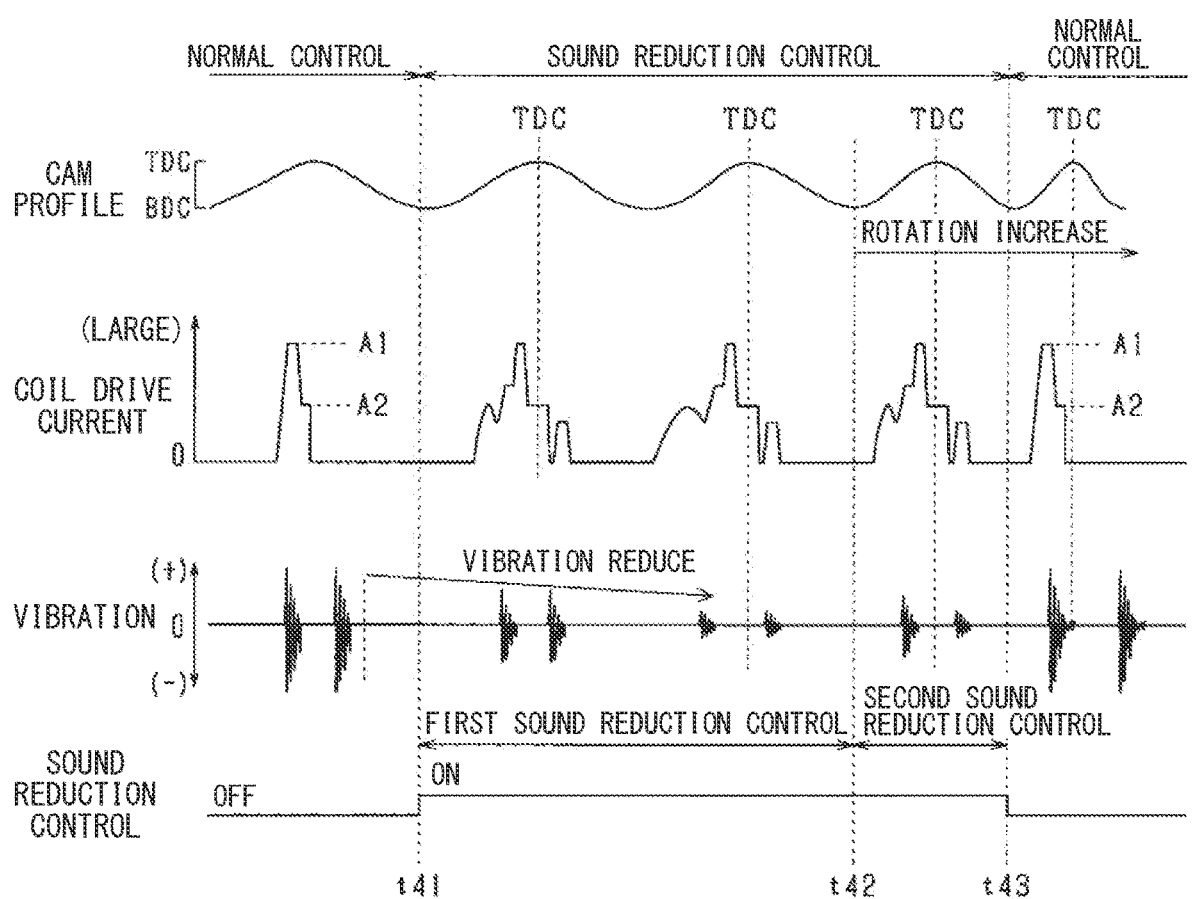
FIG. 9 is a time chart showing an outline of an example of the sound reduction control.

FIG. 9 shows a time chart showing an outline of an embodiment of the sound reduction control. In FIG. 9, it is assumed that the driver operates the accelerator while the sound reduction control is being executed, and the engine speed increases. In FIG. 9, the execution conditions of the sound reduction control are satisfied at time t41, and the sound reduction control with the first reduction control is started, such that the operating sound of the high-pressure pump 20 is suppressed. At time t42, the engine speed increases with the accelerator operation, and the first reduction control is continued. Further, it is determined that the energization width Ton becomes larger than the energization guard value Tmax. As a result, the first reduction control is switched to the second reduction control that shortens the valve closing required time T1. The engine speed is further increased, and the execution conditions of the sound reduction control are not satisfied at time t43. At this time, the sound reduction control is switched to the normal control.

According to the present embodiment described in detail above, the following excellent effects can be obtained.

When the energization control for reducing the operating sound caused by the opening and closing movement of the metering valve 30 is performed, in a case where the energization width Ton exceeds the energization guard value Tmax when the first reduction control is performed, the energization period of the valve closing control is shortened. Further, both the valve closing control and the valve opening control are performed within one cycle Tp. In this way, even in a situation where the coil energization period is restricted, it is possible to suppress both the operating sound when the metering valve 30 performs the valve closing and the valve opening. That is, according to the above configuration, the operating sound accompanied with the opening and closing movement of the metering valve 30 can be made as unnoticeable as possible throughout the entire period of one cycle Tp while satisfying the restriction of the coil energization period in one cycle Tp.

When the first reduction control is performed, when the energization width Ton exceeds the energization guard value Tmax, the target valve closing time TA is set such that the energization width Ton in one cycle Tp does not exceed the energization guard value Tmax. At the same time, the valve closing control is performed with the feedback control based on the deviation between the set target valve closing time TA and the actual valve closing required time T1. With this configuration, the valve closing required time T1 can be controlled with high accuracy, and the energization width Ton can be surely kept within the energization guard value Tmax or less. Further, the valve closing control and the valve opening control are configured to shorten the energizing period of the valve closing control. Therefore, the effect of shortening the energizing period is more significant and more preferable.

The length of one cycle Tp of the pump drive and the effective discharge time T2 vary each time according to the engine operation state. Specifically, as the engine speed becomes higher, the one cycle Tp of the pump drive becomes shorter, and the energization permission time T5 becomes shorter accordingly. Therefore, the target valve closing time TA is variably set according to the engine operation state (engine rotation speed in this embodiment) each time. According to this configuration, the sound reduction control can be performed such that the energization width Ton does not exceed the energization guard value Tmax according to the engine operation state.

When the target valve closing time TA is smaller than the minimum valve closing time Tmin, the feedback control based on the target valve closing time TA and the actual valve closing time is prohibited. In a case where the target valve closing time TA is too short, the pump power supply becomes large, and the operating sound accompanied with the valve closing becomes louder. Thus, even though the valve closing control is performed, the noise reduction effect cannot be sufficiently obtained. In this respect, with the above configuration, the sound reduction control can be effectively performed within a range in which the effect of reducing the operating sound can be sufficiently obtained.

Second Embodiment

Next, a second embodiment will be described focusing on differences from the first embodiment. In the first embodiment, when the energization width Ton is larger than the energization guard value Tmax, the energization period is secured by shortening the valve closing required time T1. In this way, both the valve closing control and the valve opening control are performed. On the other hand, in the second embodiment, when the energization width Ton is larger than the energization guard value Tmax, it is determined whether the operation sound of either the valve closing control or the valve opening control is suppressed with priority based on the engine operation state each time. Further, the control, which is determined that the operating sound should be suppressed, is performed, and the other control is not performed.

Specifically, the sound property differs between the operating sound when the metering valve 30 is opened and the operating sound when the valve is closed. In addition, which operating sound should be preferentially reduced differs depends on the engine operation state. In consideration of this point, in the present embodiment, a relationship between a parameter (hereinafter referred to as "stop priority"), which is for determining which of the valve closing control and the valve opening control should be stopped with priority, and the engine operating condition is, in advance, stored as a map or the like in consideration of the sound property of the operating sound when the valve is opened and closed. Further, when the execution condition of the sound reduction control is satisfied, it is determined, from the map or the like, which of the valve closing control and the valve opening control is to be stopped with priority according to the engine operation state each time. Further, one of the valve closing control and the valve opening control is performed based on the determination result. In this way, the operating sound when the metering valve 30 is opened and closed is made as less noticeable as possible.

FIG. 10 is a map for selecting a table showing the stop priority of the valve closing control and the valve opening control (hereinafter, referred to as "stop priority table"). FIG. 11 is the stop priority table. The stop priority table is defined according to the engine operation state. Specifically, as shown in FIG. 11, a first table, which is for a first priority region in a low rotation range and a low load range (see (a) in FIG. 11), and a second table, which is for a second priority region higher in the rotation speed and the load than those in the first priority region (see (b) in FIG. 11), are defined. Further, when the current engine operation state is in the first priority region, the valve opening control is stopped with priority according to the first table in (a) in FIG. 11. In this case, the valve closing control is performed as the sound reduction control. Further, when the engine operation state is in the second priority region, the valve closing control is stopped with priority according to the second table in (b) in FIG. 11. In this case, the valve opening control is performed as the sound reduction control.

Next, a process of the sound reduction control of the present embodiment will be described with reference to the flowchart of FIG. 12. This process is executed by the microcomputer 55 at predetermined intervals.

Figure 12:
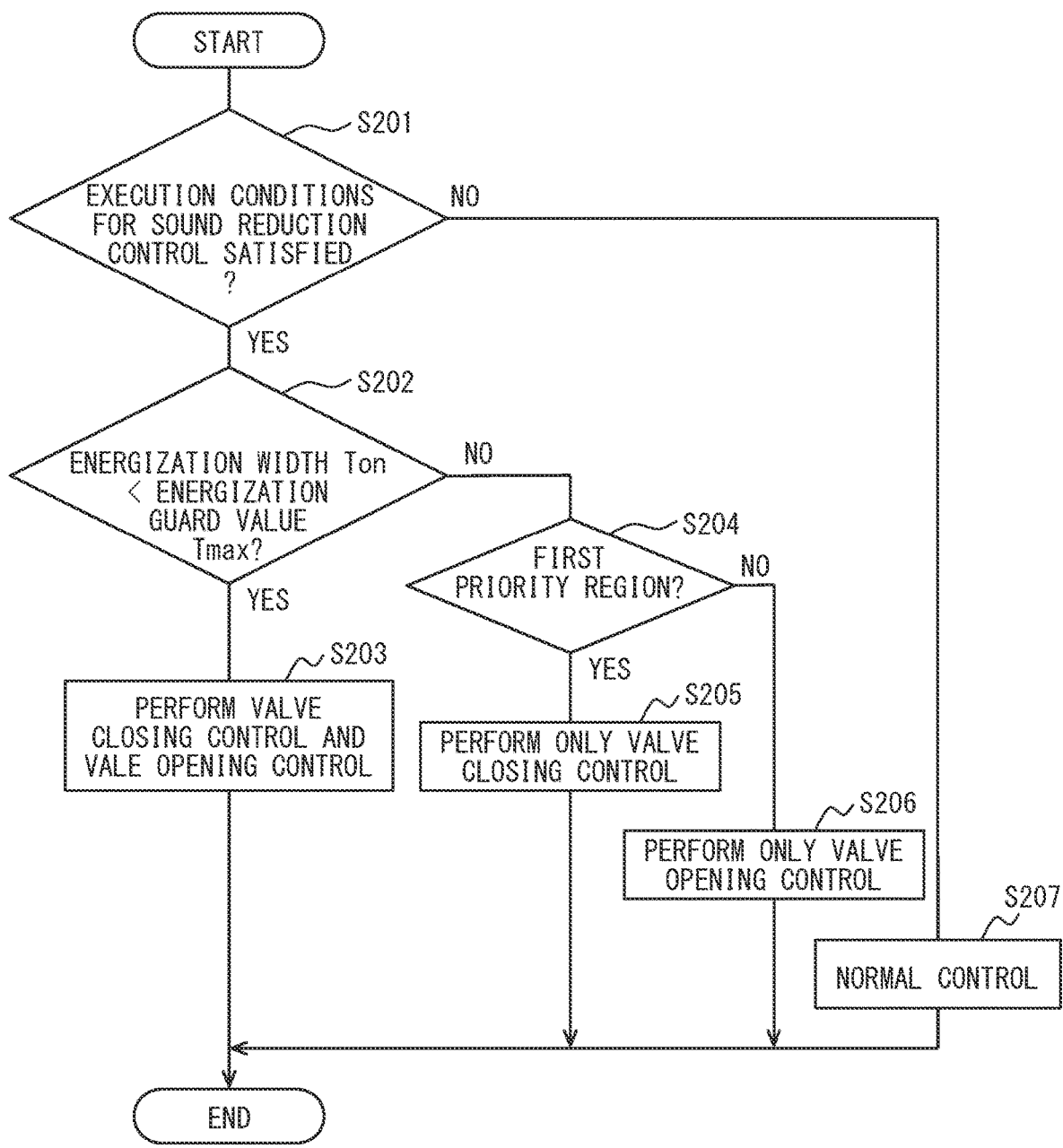
FIG. 12 is a flowchart showing a process of the sound reduction control in a second embodiment.

In FIG. 12, in step S201, it is determined whether or not an execution conditions of the sound reduction control are satisfied. In step S201, an affirmative determination is made when all the above conditions (1) to (4) are satisfied. When the execution conditions of the sound reduction control are not satisfied, the process proceeds to step S207, and the high-pressure pump 20 is driven with the normal control. On the other hand, when an affirmative determination is made in step S201, the process proceeds to step S202, and the energization width Ton when both the valve closing control and the valve opening control are performed is computed. Further, it is determined whether or not the computed energization width Ton is larger than the energization guard value Tmax.

When the energization width Ton is smaller than the energization guard value Tmax, the process proceeds to step S203, and both the valve closing control and the valve opening control are performed as the sound reduction control. On the other hand, when the energization width Ton is larger than the energization guard value Tmax, the process proceeds to step S204, and it is determined whether or not the current engine operation state is in the first priority region. When the engine operation state is in the first priority region, the process proceeds to step S205, and it is determined that the operating sound of the valve opening control should be suppressed with priority with reference to the first table. Further, only the valve closing control is performed as the noise reduction control.

On the other hand, when the current engine operation state is in the second priority region, a negative determination is made in step S204. The process proceeds to step S206, and, with reference to the second table, it is determined that the operation sound of the valve closing control should be prioritized and suppressed. Thus, only valve opening control is performed as the sound reduction control. Then, the routine ends.

Figure 13:
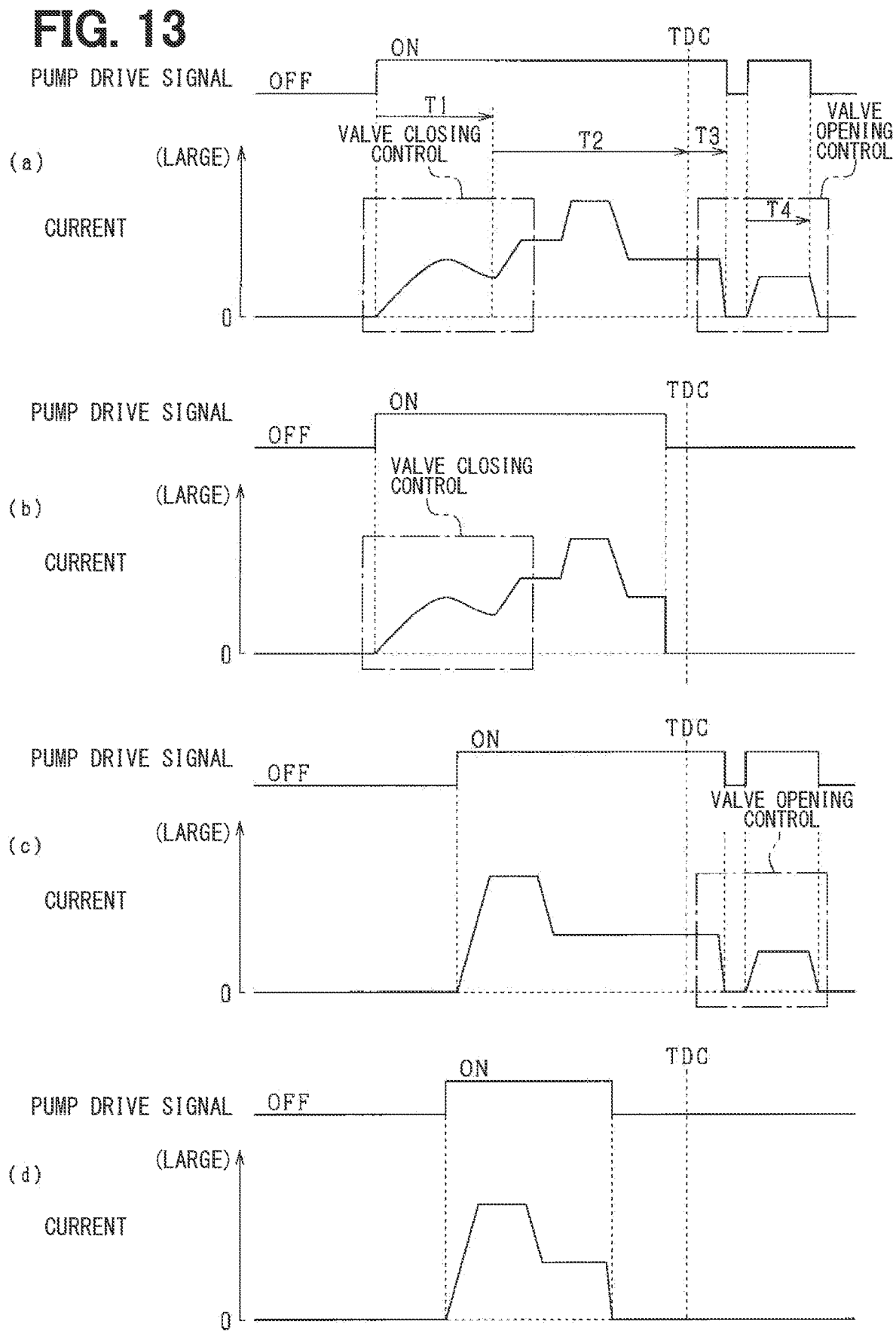
FIG. 13 is a time chart showing the sound reduction control in the second embodiment.

An embodiment of the sound reduction control will be described with reference to FIG. 13. In the sound reduction control, when the energization width Ton does not exceed the energization guard value Tmax even both the valve closing control and the valve opening control are performed, as shown in (a) in FIG. 13, the coil 42 is energized with a minimum current value required to move the valve body to the valve close position. In this way, the moving speed of the valve body is slowed down, and the valve closing required time T1 is sufficiently lengthened. Thus, the collision noise caused by the movement of the second valve body 41 toward the valve closing side is suppressed.

On the other hand, in a case where the energization width Ton exceeds the energization guard value Tmax when both the valve closing control and the valve opening control are performed as the sound reduction control, it is selected whether to stop the valve closing control with priority or to stop the valve opening control with priority based on the engine operating condition (in this embodiment, the engine speed and the engine load). Specifically, when the engine operation state is in the first priority region, as shown in (b) in FIG. 13, the valve opening control is stopped with priority, and only the valve closing control is performed. When the engine operation state is in the second priority region, as shown in (c) in FIG. 13, the valve closing control is stopped with priority, and only the valve opening control is performed. When the energization width Ton cannot be sufficiently secured even when any of the sound reduction control is performed, the control is switched to the normal control (see (d) in FIG. 13).

Figure 14:
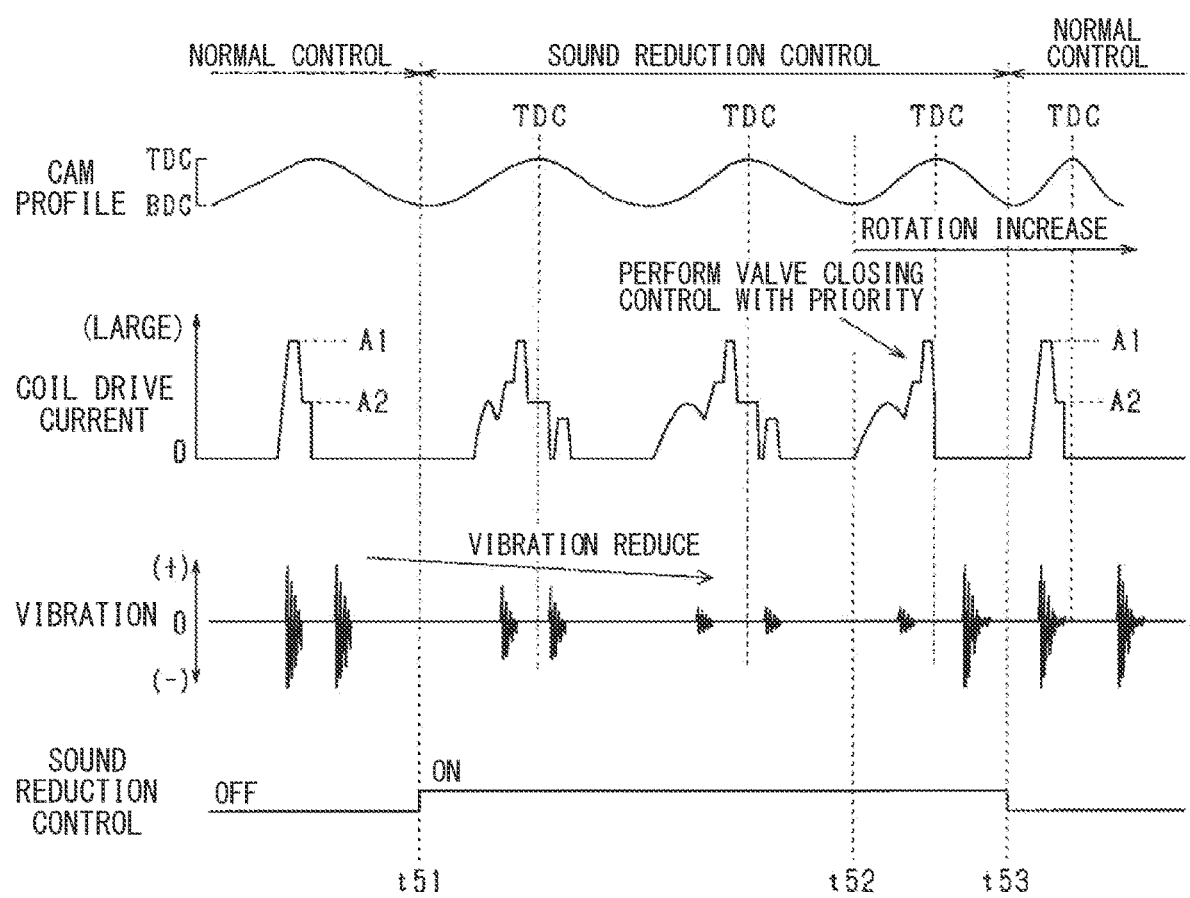
FIG. 14 is a time chart showing a specific mode in a case where execution of the sound reduction control is restricted by an energization guard in the second embodiment.
Figure 15:
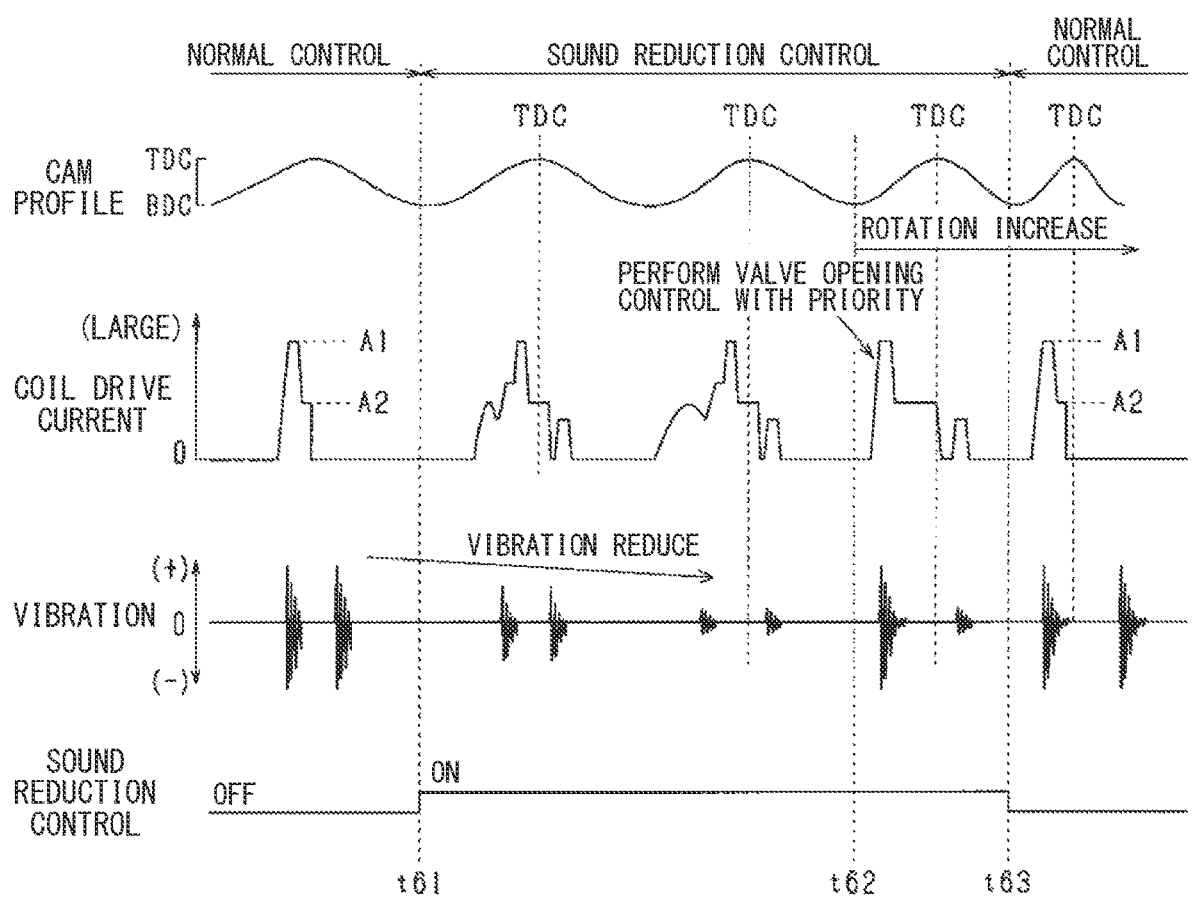
FIG. 15 is a time chart showing a specific mode in a case where execution of the sound reduction control is restricted by an energization guard in the second embodiment.

FIGS. 14 and 15 are time charts showing an outline of an example of the present embodiment. In FIGS. 14 and 15, it is assumed that the driver operates the accelerator while the sound reduction control is being executed, and the engine speed increases. FIG. 14 shows a case where the engine operation state is in the first priority region, and FIG. 15 shows a case where the engine operation state is in the second priority region.

In FIG. 14, the execution conditions of the sound reduction control are satisfied at time t51, and the sound reduction control is started, such that the operating sound of the high-pressure pump 20 is suppressed. When the engine rotation speed increases with the accelerator operation of the driver at time t52, and when the energization width Ton becomes larger than the energization guard value Tmax, the execution of the valve opening control is stopped. The engine speed is further increased, and the execution conditions of the sound reduction control are not satisfied at time t53. At this time, the sound reduction control is switched to the normal control.

Further, in FIG. 15, at time t62 after the time t61 when the execution condition of the sound reduction control is satisfied, the engine speed increases with the accelerator operation of the driver. When the energization width Ton becomes larger than the energization guard value Tmax, the execution of the valve closing control is stopped.

According to the second embodiment described in detail above, the following excellent effects can be obtained.

When the energization control is performed to reduce the operating sound accompanied with the opening and closing of the metering valve, in a case where the energization period of the electromagnetic unit for the sound reduction control is limited, one of the valve closing control and the valve opening control is selected and performed based on the operating condition of the internal combustion engine. In the metering valve 30, the sound property of the operating sound differs between the valve opening and the valve closing. Which operating sound should be prioritized and reduced depends on the engine operation state each time. In view of this point, the above configuration enables to make the operating noise accompanied with the opening/closing movement of the valve body as less noticeable as possible, while satisfying the restriction of the energizing time in one opening/closing period of the valve body in a state where the energizing time to the electromagnetic part is restricted.

Third Embodiment

Next, a third embodiment will be described focusing on differences from the first and second embodiments. In the third embodiment, when the energization width Ton is larger than the energization guard value Tmax, and the first reduction control cannot be performed, it is selected whether to perform the control to reduce the operating sound by shortening the valve closing required time T1 or to perform the control to reduce the operating sound by not executing either the valve closing control or the valve opening control, based on an effectiveness for the sound reduction effects.

A process of the sound reduction control of the present embodiment will be described with reference to the flowchart of FIG. 16. This process is executed by the microcomputer 55 at predetermined intervals.

Figure 16:
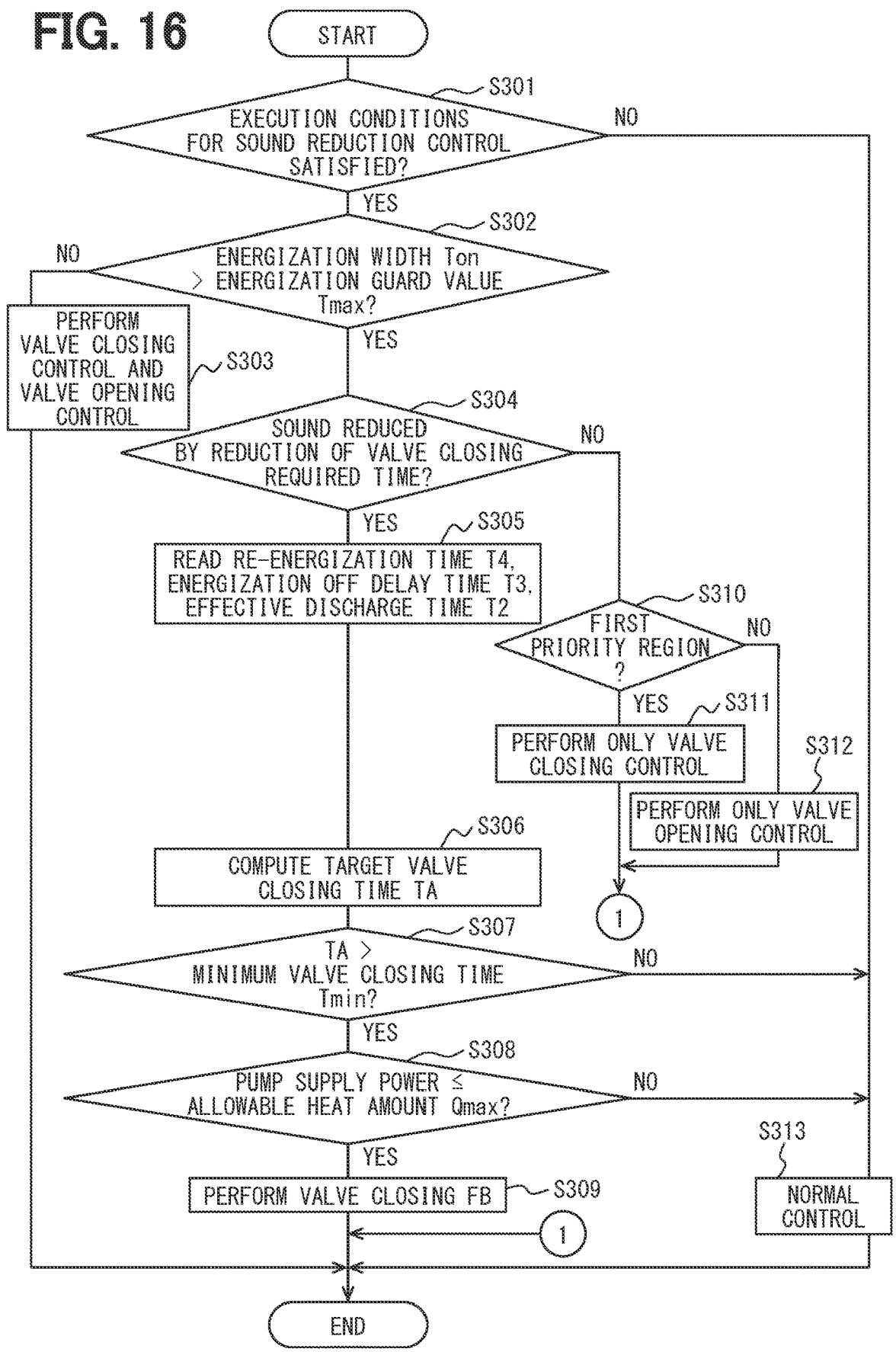
FIG. 16 is a flowchart showing a process of the sound reduction control in a third embodiment.

In FIG. 16, in step S301, it is determined whether or not an execution conditions of the sound reduction control are satisfied. In step S301, an affirmative determination is made when all the above conditions (1) to (4) are satisfied. When the execution conditions of the sound reduction control are not satisfied, the process proceeds to step S313, and the high-pressure pump 20 is driven with the normal control. On the other hand, when the execution conditions of the sound reduction control are satisfied, the process proceeds to step S302 where the energization width Ton for the first reduction control is computed, and is determined whether or not the computed energization width Ton is larger than the energization guard value Tmax.

When the energization width Ton is smaller than the energization guard value Tmax, a negative determination is made in step S302, and the process proceeds to step S303 where the first reduction control is performed as the sound reduction control. On the other hand, when the energization width Ton is larger than the energization guard value Tmax, the process proceeds to step S304 where it is determined whether or not the operating sound is reduced by shortening the valve closing required time T1.

Herein, it is selected whether to perform the control to reduce the operating sound by shortening the valve closing required time T1 or to perform the control to reduce the operating sound by not performing either the valve closing control or the valve opening control, based on the effectiveness for the sound reduction. In the present embodiment, when the engine operation state is in a predetermined low rotation speed and in a predetermined low load region, a control for reducing the operating sound by shortening the valve closing required time T1 is selected. On the other hand, when the engine operation state is in a higher rotation speed and in a high load region, the control to reduce the operating sound by not performing either the valve closing control or the valve opening control is selected.

When an affirmative determination is made in step S304, the process proceeds to step S305, and in steps S305 to S309, the same process as in steps S104 to S108 of FIG. 8 is executed. On the other hand, when a negative determination is made in step S304, the process proceeds to step S310, and in steps S310 to S312, the same processing as in steps S204 to S206 of FIG. 12 is executed. Then, this process is terminated.

According to the third embodiment described in detail above, the following excellent effects can be obtained.

The configuration is employed to switch between the control that shortens the valve closing required time T1 and performs both the valve closing control and the valve opening control and the control that performs only one of the valve closing control and the valve opening control, based on the effectiveness for the sound reduction effect, when the energization width Ton exceeds the energization guard value Tmax in a case where the first reduction control is to be performed. Which one of the control, which shortens the valve closing required time T1 and performs both the valve closing control and the valve opening control, and the control, which performs only one of the valve closing control and the valve opening control, produces a better sound reduction effect may differ depending on the engine operating condition each time. In view of this point, with the above configuration, even when the energization period of the coil 42 is restricted, the effect of reducing the operating sound by the sound reduction control can be sufficiently obtained.

Other Embodiments

The present disclosure is not limited to the embodiments describe above, and may be implemented, for example, as follows.
- In the first embodiment, the target valve closing time TA is set based on the engine speed. On the other hand, the target valve closing time TA may be set based on a parameter, which is related to the engine operation state, other than the engine speed. The parameter related to the engine operation state other than the engine speed may include, for example, the required discharge amount of the high-pressure pump 20, the vehicle speed, the common rail pressure, and the like.
- In the second embodiment, either the valve closing control or the valve opening control is selected and performed by using the map showing the relationship among the engine speed, the engine load, and priority. On the other hand, a relationship between the priority and a parameter, which is related to the engine operation state and is other than the engine speed and the engine load, may be defined. The parameter includes, for example, the required discharge amount of the high-pressure pump 20, the vehicle speed, the common rail pressure, and the like.
- In the first embodiment, the target valve closing time TA may be computed based on the allowable coil heat generation amount. Specifically, the target valve closing time TA is computed with the following formula (2).

$$TA = Qmax - \sum Q(\text{re-energization period, energization off delay period, effective discharge period})$$
$$= (Qmax - A11^{\wedge}2^{*}R^{*}T21 + A12^{\wedge}2^{*}R^{*}T22 + A2^{\wedge}2^{*}R^{*}T3 + A3^{\wedge}2^{*}R^{*}T4)/R$$
(2)

In equation (2), A11, A12, A2, A3, T21 to T23, and T4 correspond to the symbols shown in FIG. 5, respectively. Qmax indicates the allowable heat amount.
- In the first embodiment, the feedback control is performed based on the deviation between the target valve closing time TA and the actual valve closing required time T1. On the other hand, the valve closing required time T1 may be controlled at the target valve closing time TA by an open-loop control.
- In the above embodiment, the energization off delay control and the re-energization control are performed as the valve opening control. On the other hand, only one of the energization off delay control and the re-energization control may be performed as the valve opening control. For example, the present disclosure may be applied to a configuration in which the valve closing control and the re-energization control are performed and in which the energization off delay control is not performed (the holding time at the second current value A2 is the same as that in the normal state).
- The energization width Ton is used as the required period for the energization when it is determined whether or not the required period for energizing the coil 42 in one opening and closing period of the first valve body 31 exceeds the predetermined upper limit value. On the other hand, a period during which energization is actually performed in the energization width Ton may be compared with the upper limit value.
- In the above embodiment, the present disclosure is applied to a system provided with a normally open type metering valve 30 that opens when not energized. On the other hand, the present disclosure may be applied to a system provided with a normally closed type metering valve that is closed when not energized.
- In the above embodiment, a configuration where the present disclosure is applied to a fuel supply system including the metering valve 30 having two valve bodies (first valve body 31 and second valve body 41) has been described. On the other hand, the present disclosure may be applied to a fuel supply system including a metering valve having only one valve body. Specifically, the present disclosure may be applied to a system in which a metering valve is arranged as a valve body in a fuel inlet passage communicating with a pressurizing chamber, and is configured to be displaced by switching between energization and de-energization of a coil to supply fuel to and block fuel from the pressurizing chamber according to the displacement. In this system, operating sound is caused by vibration when the valve body collides with the stopper portion in the valve closing and in the valve opening. Therefore, the present disclosure can be applied to such a system, in which the valve closing control is executed when the valve is closed and in which the re-energization control is executed when the valve is opened to reduce noise.
- In the above embodiment, a gasoline engine is used as the internal combustion engine. On the other hand, a diesel engine may be used. That is, the present disclosure may be embodied in a control device for a fuel supply system for a diesel engine of a common rail type.

Although the disclosure has been described in accordance with the embodiments, it is understood that the present disclosure is not limited to such embodiment or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A control device for a high-pressure pump, the high-pressure pump including
   a plunger that is configured to reciprocate with rotation of a rotary shaft to change a volume of a pressurizing chamber and
   a metering valve that includes a valve body located in a fuel inlet passage, which is communicable with the pressurizing chamber, the metering valve configured to cause the valve body to move to supply fuel to and to block fuel from the pressurizing chamber by switching between energization and de-energization of an electromagnetic unit,
   the control device configured to switch between an open state and a close state of the metering valve based on an operation state of an internal combustion engine to adjust a fuel discharge amount of the high-pressure pump, the control device comprising:

an energization control unit that is configured to perform, when a predetermined execution condition is satisfied, a valve closing control and a valve opening control in one opening and closing period in which the valve body opens and closes, the valve closing control being to reduce a moving speed of the valve body to be less than that in a normal state when the valve body moves to a valve closing side to reduce operating sound caused when the valve body moves to the valve closing side, the valve opening control being to reduce operating sound, which is caused when the valve body moves to a valve opening side, by energizing the electromagnetic unit when the valve body moves to the valve opening side;

an energization determination unit that is configured to, when both the valve closing control and the valve opening control are performed in the one opening and closing period, determine whether an energization period of the electromagnetic unit in the one opening and closing period exceeds a predetermined upper limit value; and a time control unit that is configured to, when the energization determination unit determines that the energization period of the electromagnetic unit exceeds the upper limit value, control a moving speed of the valve body when the valve body moves to the valve closing side, such that the energization period of the electromagnetic unit in the one opening and closing period does not exceed the upper limit value, to cause the energization control unit to perform both the valve closing control and the valve opening control in the one opening and closing period.

2. The control device for a high-pressure pump according to claim 1, further comprising:

a time detection unit that is configured to detect a moving required time, which is required for the valve body to move to a target position by switching between energization and de-energization of the electromagnetic unit; and a target value setting unit that is configured to set a target moving time, which is a target value of a time required for closing the valve body, such that the energization period of the electromagnetic unit in the one opening and closing period does not exceed the upper limit value, wherein the time control unit is configured to perform a feedback control based on a deviation between the target moving time, which is set by the target value setting unit, and the moving required time, which is detected by the time detection unit.

3. The control device for a high-pressure pump according to claim 2, wherein the target value setting unit is configured to variably set the target moving time based on an operation state of the internal combustion engine.

4. The control device for a high-pressure pump according to claim 2, further comprising:

a time determination unit that is configured to determine whether the target moving time is greater than a predetermined lower limit value, wherein the time control unit is configured to prohibit the feedback control when the time determination unit determines that the target moving time is less than the lower limit value.

5. The control device for a high-pressure pump according to claim 1, further comprising:

a selection control unit that is configured to, when the energization determination unit determines that the energization period of the electromagnetic unit exceeds the upper limit value, select and perform one of the valve closing control and the valve opening control based on an operating condition of the internal combustion engine, wherein the control device is configured to, when the predetermined execution condition is satisfied and when the energization determination unit determines that the energization period of the electromagnetic unit exceeds the upper limit value, based on effectiveness of sound reduction:

a shortening control to cause the time control unit to perform both the valve closing control and the valve opening control; and a selection control to cause the selection control unit to select and perform one of the valve closing control and the valve opening control.

6. The control device for a high-pressure pump according to claim 1, wherein the metering valve includes, as the valve body, a first valve body that is configured to allow and block a flow of fuel in the fuel inlet passage and a second valve body that is movable in a same direction as an opening and closing movement of the first valve body and configured to make contact with and to move away from the first valve body by switching between energization and de-energization of the electromagnetic unit to open and close the first valve body.

7. A control device comprising:

a processor configured to perform energizing of an electromagnetic unit to move a valve body of a metering valve to block a fuel inlet passage from a pressurizing chamber of a high-pressure pump, perform de-energizing of the electromagnetic unit to move the valve body to communicate the fuel inlet passage with the pressurizing chamber to supply fuel to the pressurizing chamber, perform switching between the energizing and the de-energizing to adjust a fuel discharge amount of the high-pressure pump to an internal combustion engine based on an operation state of the internal combustion engine, perform a valve closing control to reduce a moving speed of the valve body to be less than that in a normal state when the valve body moves to a valve closing side to reduce operating sound caused when the valve body moves to the valve closing side, perform a valve opening control to reduce operating sound, which is caused when the valve body moves to a valve opening side, by energizing the electromagnetic unit when the valve body moves to the valve opening side, determine, when both the valve closing control and the valve opening control are performed in one opening and closing period, in which the valve body opens and closes, whether an energization period of the electromagnetic unit in the one opening and closing period exceeds a predetermined upper limit value, and control, on determination that the energization period exceeds the upper limit value, the moving speed of the valve body when the valve body moves to the valve closing side, such that the energization period in the one opening and closing period does not exceed the upper limit value, to perform both the valve closing control and the valve opening control in the one opening and closing period.

8. A computer-implemented method performed by a processor for controlling a high-pressure pump, comprising:

energizing an electromagnetic unit to move a valve body of a metering valve to block a fuel inlet passage from a pressurizing chamber of the high-pressure pump;

de-energizing the electromagnetic unit to move the valve body to communicate the fuel inlet passage with the pressurizing chamber to supply fuel to the pressurizing chamber;

switching between the energizing and the de-energizing to adjust a fuel discharge amount of the high-pressure pump to an internal combustion engine based on an operation state of the internal combustion engine;

performing a valve closing control to reduce a moving speed of the valve body to be less than that in a normal state when the valve body moves to a valve closing side to reduce operating sound caused when the valve body moves to the valve closing side;

performing a valve opening control to reduce operating sound, which is caused when the valve body moves to a valve opening side, by energizing the electromagnetic unit when the valve body moves to the valve opening side;

determining, when both the valve closing control and the valve opening control are performed in one opening and closing period, in which the valve body opens and closes, whether an energization period of the electromagnetic unit in the one opening and closing period exceeds a predetermined upper limit value; and controlling, on determination that the energization period exceeds the upper limit value, the moving speed of the valve body when the valve body moves to the valve closing side, such that the energization period in the one opening and closing period does not exceed the upper limit value, to perform both the valve closing control and the valve opening control in the one opening and closing period.

* * * * *